US012224599B2

(12) United States Patent
Jain et al.

(10) Patent No.: US 12,224,599 B2
(45) Date of Patent: Feb. 11, 2025

(54) SYSTEMS AND METHODS FOR SECURE WIRELESS TRANSMISSION OF POWER USING UNIDIRECTIONAL COMMUNICATION SIGNALS FROM A WIRELESS-POWER-RECEIVING DEVICE

(71) Applicant: Energous Corporation, San Jose, CA (US)

(72) Inventors: Deepak Jain, San Ramon, CA (US); Noorul Ameen Thufile Ahamed, San Jose, CA (US)

(73) Assignee: Energous Corporation, San Jose, CA (US)

( * ) Notice: Subject to any disclaimer, the term of this patent is extended or adjusted under 35 U.S.C. 154(b) by 251 days.

(21) Appl. No.: 17/885,443

(22) Filed: Aug. 10, 2022

(65) Prior Publication Data

US 2023/0113590 A1  Apr. 13, 2023

Related U.S. Application Data

(63) Continuation of application No. 17/385,755, filed on Jul. 26, 2021, now Pat. No. 11,469,629.
(Continued)

(51) Int. Cl.
*H02J 50/80* (2016.01)
*H02J 7/00* (2006.01)
(Continued)

(52) U.S. Cl.
CPC .............. *H02J 50/80* (2016.02); *H02J 50/23* (2016.02); *H02J 50/27* (2016.02); *H02J 50/40* (2016.02); *H02J 7/00045* (2020.01); *H02J 50/60* (2016.02)

(58) Field of Classification Search
None
See application file for complete search history.

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 201278367 Y | 7/2009 |
| CN | 102227884 A | 10/2011 |

(Continued)

OTHER PUBLICATIONS

Energous Corp., IPRP, PCT/US2014/040697, Dec. 8, 2015, 9 pgs.
(Continued)

*Primary Examiner* — Jared Fureman
*Assistant Examiner* — Joel Barnett
(74) *Attorney, Agent, or Firm* — Morgan, Lewis & Bockius LLP

(57) ABSTRACT

An exemplary embodiment of secure wireless transmission of power using unidirectional communication signals from a wireless-power-receiving device. The method includes, receiving, from a wireless-power-transmitting device that includes a first communications radio, a first wireless-power-transmission signal at a wireless-power-receiving device that includes a second communications radio. In response to receiving the first wireless-power-transmission signal: broadcasting, via the second communications radio of the wireless-power-receiving device and without establishing a communications channel between the first and second communications radios, a data packet, the data packet including information identifying (i) at least one power requirement of a power source of the wireless-power-receiving device (ii) an amount of power received by the
(Continued)

wireless-power-receiving device from the first wireless-power-transmission signal. After broadcasting the data packet, receiving, from the wireless-power-transmitting device, additional wireless-power-transmission signals at the wireless-power-receiving device, wherein the wireless-power-transmitting device transmits each of the additional wireless-power-transmission signals using a predetermined sequence of different transmission characteristics.

17 Claims, 10 Drawing Sheets

Related U.S. Application Data

(60) Provisional application No. 63/178,465, filed on Apr. 22, 2021, provisional application No. 63/064,912, filed on Aug. 12, 2020.

(51) Int. Cl.
*H02J 50/23* (2016.01)
*H02J 50/27* (2016.01)
*H02J 50/40* (2016.01)
*H02J 50/60* (2016.01)

(56) References Cited

U.S. PATENT DOCUMENTS

| | | | |
|---|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |

(56) References Cited

U.S. PATENT DOCUMENTS

| | | |
|---|---|---|
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,859,758 B1 | 1/2018 | Leabman |
| 9,859,797 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,941,754 B2 | 4/2018 | Leabman et al. |
| 9,948,135 B2 | 4/2018 | Leabman et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |

(56) References Cited

U.S. PATENT DOCUMENTS

| | | |
|---|---|---|
| 10,008,777 B1 | 6/2018 | Broyde et al. |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,491,029 B2 | 11/2019 | Hosseini |
| 10,498,144 B2 | 12/2019 | Leabman et al. |
| 10,511,097 B2 | 12/2019 | Kornaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,848,853 B2 | 11/2020 | Leabman et al. |
| 10,879,740 B2 | 12/2020 | Hosseini |
| 10,923,954 B2 | 2/2021 | Leabman |
| 10,958,095 B2 | 3/2021 | Leabman et al. |
| 10,965,164 B2 | 3/2021 | Leabman et al. |
| 10,985,617 B1 | 4/2021 | Johnston et al. |
| 10,992,185 B2 | 4/2021 | Leabman |
| 10,992,187 B2 | 4/2021 | Leabman |
| 11,011,942 B2 | 5/2021 | Liu |
| 11,018,779 B2 | 5/2021 | Sarajedini |
| 11,056,929 B2 | 7/2021 | Bell et al. |
| 11,114,885 B2 | 9/2021 | Hosseini et al. |
| 11,139,699 B2 | 10/2021 | Johnston et al. |
| 11,159,057 B2 | 10/2021 | Kabiri et al. |
| 11,233,425 B2 | 1/2022 | Leabman |
| 11,245,191 B2 | 2/2022 | Kornaros et al. |
| 11,342,798 B2 | 5/2022 | Johnston et al. |
| 11,437,735 B2 | 9/2022 | Papio-Toda et al. |
| 11,469,629 B2 | 10/2022 | Jain et al. |
| 11,515,732 B2 | 11/2022 | Contopanagos et al. |
| 11,539,243 B2 | 12/2022 | Katajamaki et al. |
| 2001/0027876 A1 | 10/2001 | Tsukamoto et al. |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brian et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Chi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |

(56) References Cited

U.S. PATENT DOCUMENTS

| | | |
|---|---|---|
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0252370 A1 | 11/2006 | Goossens et al. |
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0152954 A1* | 6/2009 | Le .................. H02J 50/20 307/110 |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |

(56) References Cited

U.S. PATENT DOCUMENTS

| | | |
|---|---|---|
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1* | 12/2012 | Lee .................. H04B 5/79 307/104 |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |

(56) References Cited

U.S. PATENT DOCUMENTS

| | | |
|---|---|---|
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0028093 A1* | 1/2014 | Aikawa ............... H02J 50/12 307/104 |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |

(56) References Cited

U.S. PATENT DOCUMENTS

| | | |
|---|---|---|
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |

(56) References Cited

U.S. PATENT DOCUMENTS

| | | |
|---|---|---|
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126775 A1 | 5/2016 | Park et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0359380 A1* | 12/2016 | Zeine ................... H02J 50/20 |
| 2016/0380464 A1 | 12/2016 | Chin et al. |
| 2016/0380466 A1 | 12/2016 | Yang et al. |
| 2017/0005481 A1 | 1/2017 | Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0274787 A1 | 9/2017 | Salter et al. |
| 2017/0279305 A1* | 9/2017 | Staring ................. H02J 50/10 |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0227018 A1 | 8/2018 | Moshfeghi |
| 2018/0262018 A1 | 9/2018 | Yankowitz |
| 2018/0262060 A1* | 9/2018 | Johnston ............... H02J 7/0042 |
| 2018/0301934 A1 | 10/2018 | Prabhala et al. |
| 2018/0309314 A1 | 10/2018 | White et al. |
| 2018/0316391 A1 | 11/2018 | Hijikata |
| 2018/0343040 A1 | 11/2018 | Luzinski et al. |
| 2019/0052979 A1 | 2/2019 | Chen et al. |
| 2019/0074862 A1 | 3/2019 | Wang et al. |
| 2019/0296586 A1 | 9/2019 | Moshfeghi |
| 2019/0326782 A1 | 10/2019 | Graham et al. |
| 2019/0386522 A1 | 12/2019 | Park et al. |
| 2019/0393928 A1 | 12/2019 | Leabman |
| 2020/0091608 A1 | 3/2020 | Alpman et al. |
| 2020/0112204 A1 | 4/2020 | Hosseini et al. |
| 2020/0235614 A1 | 7/2020 | Swan et al. |
| 2020/0244111 A1 | 7/2020 | Johnston et al. |
| 2020/0274397 A1 | 8/2020 | Hwang et al. |
| 2020/0373072 A1* | 11/2020 | Leem .................... H01F 27/306 |
| 2022/0052564 A1 | 2/2022 | Jain et al. |

FOREIGN PATENT DOCUMENTS

| | | |
|---|---|---|
| CN | 102292896 A | 12/2011 |
| CN | 102860037 A | 1/2013 |
| CN | 103151848 A | 6/2013 |
| CN | 103348563 A | 10/2013 |
| CN | 203826555 U | 9/2014 |
| CN | 104090265 A | 10/2014 |
| CN | 104167773 A | 11/2014 |
| CN | 104347915 A | 2/2015 |
| CN | 105765821 A | 7/2016 |
| CN | 106329116 A | 1/2017 |

(56) References Cited

FOREIGN PATENT DOCUMENTS

| | | |
|---|---|---|
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002319816 A | 10/2002 |
| JP | 2006157586 A | 6/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2012016171 A | 1/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014075927 A | 4/2014 |
| JP | 2014112063 A | 6/2014 |
| JP | 2014176131 A | 9/2014 |
| JP | 2014217044 A | 11/2014 |
| JP | 2015027345 A | 2/2015 |
| JP | 2015128349 A | 7/2015 |
| JP | 2015128370 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140085200 A | 7/2014 |
| KR | 20140148270 A | 12/2014 |
| KR | 20150077678 A | 7/2015 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016013944 A1 | 1/2016 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., IPRP, PCT/US2020/067566, Jul. 5, 2022, 8 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 10, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.

(56) References Cited

OTHER PUBLICATIONS

Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2018/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/067566, Apr. 27, 2021, 12 pgs.
Energous Corp., ISRWO, PCT/US2021/045269, Dec. 7, 2021, 7 pgs.
Notice of Intent to Issue Reexam Certificate: U.S. Appl. No. 90/013,793 Feb. 2, 2017, 8 pgs.
Order Granting Reexamination Request, U.S. Appl. No. 90/013,793 Aug. 31, 2016, 23 pgs.

(56) References Cited

OTHER PUBLICATIONS

Ossia Inc. vs Energous Corp., Declaration of Stephen B. Heppe in Support of Petition for Post-Grant Review of U.S. Appl. No. 9,124,125, PGR2016-00023, May 31, 2016, 144 pgs.
Ossia Inc. vs Energous Corp., Declaration of Stephen B. Heppe in Support of Petition for Post-Grant Review of U.S. Appl. No. 9,124,125, PGR2016-00024, May 31, 2016, 122 pgs.
Ossia Inc. vs Energous Corp., Patent Owner Preliminary Response, Sep. 8, 2016, 95 pgs.
Ossia Inc. vs Energous Corp., Petition for Post Grant Review of U.S. Appl. No. 9,124,125, May 31, 2016, 86 pgs.
Ossia Inc. vs Energous Corp., Petition for Post-Grant Review of U.S. Appl. No. 9,124,125, May 31, 2016, 92 pgs.
Ossia Inc. vs Energous Corp., PGR2016-00023-Institution Decision, Nov. 29, 2016, 29 pgs.
Ossia Inc. vs Energous Corp., PGR2016-00024-Institution Decision, Nov. 29, 2016, 50 pgs.
Ossia Inc. vs Energous Corp., PGR2016-00024-Judgement-Adverse, Jan. 20, 2017, 3 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: a Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.

Mao et al., "BeamStar: an Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE Apsursi, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: a Versatile Approach to Spatial Filtering", IEEE, ASSP Magazine, Apr. 1988, pp. 4-24.
Wei et al., "Design of a Wideband Horizontally Polarized Omnidirectional Printed Loop Antenna," IEEE Antennas and Wireless Propagation Letters, vol. 11, Jan. 3, 2012, 4 pgs.
Zeng et al., "A Compact Fractal Loop Rectenna for RF Energy Harvesting," IEEE Antennas And Wireless Propagation Letters, vol. 16, Jun. 26, 2017, 4 pgs.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

\* cited by examiner

500 ⬎

516 The data packet and the additional data packets are broadcast via a Bluetooth low energy (BLE) communication protocol

518 The additional data packets include information that causes the wireless-power-transmitting device to adjust characteristics of the additional wireless-power-transmission signals provided to the wireless-power receiving device, wherein the wireless-power-transmitting device adjusts characteristics of the additional wireless power transmission signals when the information specifies that the wireless-power-receiving device (i) is not charging, (ii) is charging but needs more power, (iii) is charging at an optimal configured rate, (iv) is charging but is receiving too much power, or (v) has a fault condition

520 The wireless-power-receiving device is within a wireless-power-transmission range of the wireless-power-transmitting device when the second communications radio transmits the data packet

522 The wireless-power-transmission range is a near-field transmission range of less than or equal to 12 inches from the wireless-power-transmitting device

524 The wireless-power-transmission range is a far-field transmission range of greater than 12 inches from the wireless-power-transmitting device

526 The wireless-power-receiving device is placed within the wireless-power-transmission range before receiving the first wireless-power-transmission signal at the wireless-power-receiving device and while the first communications radio of the wireless-power-transmitting device is not scanning, and
    the wireless-power-transmitting device causes the first communications radio to begin scanning for broadcasted data packets in response to detecting the wireless-power-receiving device within the wireless-power-transmission range

528 The predetermined sequence of different transmission characteristics is a sequence in which the wireless-power-transmitting device sends the additional wireless-power-transmission signals at different points in time by toggling transmissions on and off over a given period of time 530 The predetermined sequence of different transmission characteristics is a sequence in which the wireless-power-transmitting device transmits each of the additional wireless-power-transmission signals using different power levels 532 The second communications radio of the wireless-power-receiving device communicates in a unidirectional manner with the first communications radio of the wireless-power-transmitting device and does not receive communication from the wireless-power-transmitting device 534 The wireless-power-receiving device broadcasts each of the data packet and the additional data packets at a predetermined time interval 536 The predetermined time interval is equal to 100ms or less.

538 The data packet and each respective additional data packet include information about current charging state, voltage, power received from the wireless-power-transmitting device, and information indicating whether more or less power is required 540 The data packet and each respective additional data packet include encrypted data 542 The wireless-power-receiving device includes a wireless-power-receiving circuit with power-harvesting circuitry and a memory of approximately 32 KBs, and the instructions occupy approximately 5 KBs or less of the memory 544 The data packet and the additional data packets also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition

Figure 5C

SYSTEMS AND METHODS FOR SECURE WIRELESS TRANSMISSION OF POWER USING UNIDIRECTIONAL COMMUNICATION SIGNALS FROM A WIRELESS-POWER-RECEIVING DEVICE

RELATED APPLICATION

This application is a continuation of U.S. patent application Ser. No. 17/385,755, filed on Jul. 26, 2021, entitled "Systems And Methods For Secure Wireless Transmission Of Power Using Unidirectional Communication Signals From A Wireless-Power-Receiving Device," which claims priority to U.S. Provisional Application Ser. No. 63/178,465, filed Apr. 22, 2021, entitled "Systems and Methods for Secure Wireless Transmission of Power Using Unidirectional Communication Signals from A Wireless-Power-Receiving Device," and also claims priority from U.S. Provisional Application Ser. No. 63/064,912, filed Aug. 12, 2020, entitled "Systems and Methods for Secure Wireless Transmission of Power Using Unidirectional Communication Signals from A Wireless-Power-Receiving Device," both of which are incorporated by this reference herein in their respective entireties.

TECHNICAL FIELD

The embodiments herein generally relate to systems and methods for wireless power transmission and, more specifically, to systems and methods for secure wireless transmission of power using unidirectional communication signals from a wireless-power-receiving device.

BACKGROUND

Some wireless power transmission systems, such as charging pads, utilize bidirectional communication between a wireless power receiving device and a wireless power transmitting device (e.g., a charging pad). These charging pads (e.g., wireless power transmitting devices) have to communicate with wireless-power-receiving devices to ensure that the device to be charged is the correct device, and to receive charging information (e.g., battery level, charge state, power needed, etc.). Bidirectional communication frameworks can take up a lot of storage space on the limited memory available on certain circuits used in conjunction with the reception of wireless power. Since storage is at a premium on these circuits, bidirectional communication can be undesirable, so there is a need for a communication framework that takes up less space, while still ensuring that power can be wirelessly transmitted in a secure way.

SUMMARY

Accordingly, there is a need for a communication framework implemented at a wireless-power-receiving device (e.g., a device that includes (i) wireless-power-receiving circuitry, including at least one antenna and power-conversion circuitry for converting wirelessly-delivered energy into usable power and (ii) an electronic device, such as a smartphone, smart watch, laptop, hearing aid, that is configured to be powered or charged by the usable power from the wireless-power-receiving circuitry) that uses minimal storage space. To this end, systems and methods are described herein that are capable of allowing wireless-power-receiving devices to receive a charge without establishing a communication channel (e.g., no handshake protocol is exchanged between a communication radio of a receiving device and a communication radio of a transmitting device). Instead of a bidirectional communication channel being used to communicate information related to wireless charging (e.g., radio frequency power waves delivered over a distance to wireless-power-receiving circuitry that then converts energy from the RF power waves to usable power for charging or powering an electronic device coupled with the wireless-power-receiving device), unidirectional advertisements can be used to achieve desired results of a secure transmission of wireless power. In this improved communication framework, the wireless-power-receiving device is able to transmit advertisements, and a nearby wireless-power-transmitting device is able to receive information that allows it to determine and adjust to the charging needs of the wireless-power-receiving device based on data included in these advertisements. Then the wireless-power-transmitting device provides a wirelessly-delivered charge to the wireless-power-receiving device. In some embodiments using this framework, there is no communication received at the wireless-power-receiving device from the wireless-power-transmitting device. Thus, the wireless-power-receiving circuitry can be coupled with many different types of electronic devices (e.g., smartphones, smart watches, laptops, hearing aids, etc.) to allow those electronic devices to be wirelessly charged using this unidirectional communication framework and those electronic devices do not need additional software to allow them to receive a wireless charge. In other words, this new framework is advantageous over a bidirectional communication framework because it can be implemented using less storage space on the wireless-power-receiving device (while also not requiring any additional, or a very minimal amount of, storage space on an electronic device that is coupled with the wireless-power-receiving circuitry) without sacrificing security.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 5A-5C show flow diagrams of a method of transmitting unidirectional communication signals, in accordance with some embodiments.

Figure 1A:
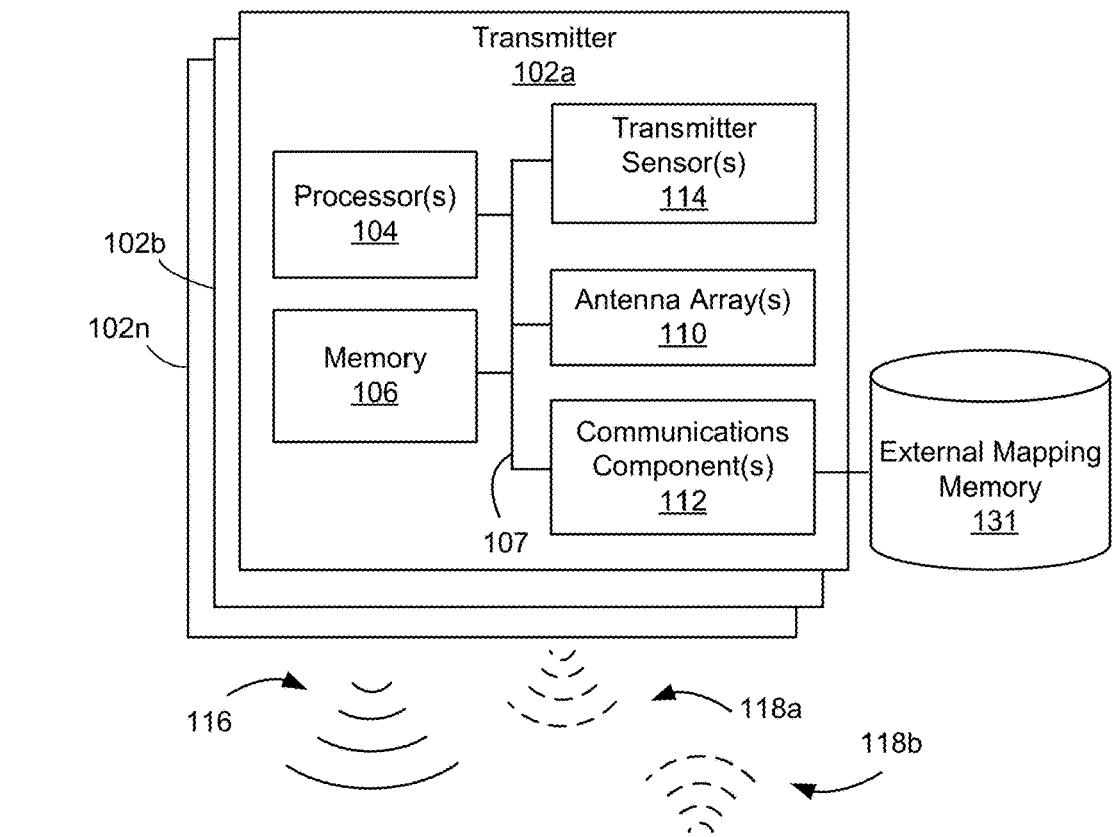
FIG. 1A is a block diagram of an RF wireless power transmission system, in accordance with some embodiments.
Figure 1A:
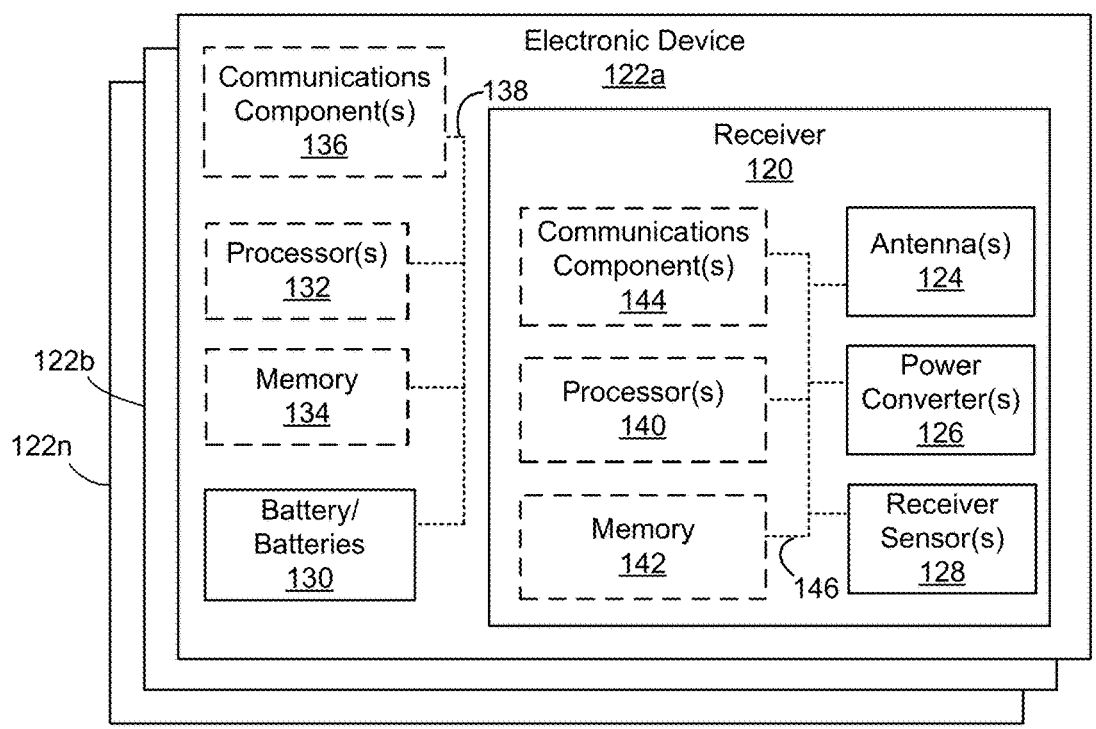

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of components of wireless power transmission environment 100, in accordance with some embodiments. Wireless power transmission environment 100 includes, for example, transmitters 102 (e.g., transmitters 102a, 102b . . . 102n), and one or more receivers 120 (e.g., receivers 120a, 120b . . . 120n). In some embodiments, each respective wireless power transmission environment 100 includes a number of receivers 120 (also referred to as wireless-power-receiving circuitry), each of which is associated with a respective electronic device 122. In some instances, the transmitter 102 is referred to herein as a "wireless-power-transmitting device" or a "wireless power transmitter." Additionally, in some instances, the receiver 120 and the electronic device 122a, when coupled together are collectively referred to herein as a "wireless-power-receiving device."

An example transmitter 102 (e.g., transmitter 102a) includes, for example, one or more processor(s) 104, a memory 106, one or more antenna arrays 110, one or more communications components 112 (also referred to herein as a "wireless communications radio," a "communications radio" or simply a "radio"), and/or one or more transmitter sensors 114. In some embodiments, these components are interconnected by way of a communications bus 107. References to these components of transmitters 102 cover embodiments in which one or more of these components (and combinations thereof) are included. The components are discussed in further detail below with reference to FIG. 2.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of signals 116 by antenna array 110), one or more communications component processors (e.g., in some embodiments the communications component is configured to receive communications transmitted by a wireless-power-receiving device without opening a communication channel, for example this also can mean that no handshake protocol is necessary to allow the transmitter and receiving devices to communicate with one another during a wireless-charging process (as described in more detail below in reference to FIGS. 4 and 5A-5C) and/or one or more sensor processors (configured to, e.g., control operation of transmitter sensor 114 and/or receive output from transmitter sensor 114).

The receiver 120 receives power transmission signals 116. In some embodiments, the receiver 120 includes one or more antennas 124 (e.g., an antenna array including multiple antenna elements), power converter 126, receiver sensor 128, and/or other components or circuitry (e.g., processor(s) 140, memory 142, and/or communication component(s) 144. In some embodiments, these components are interconnected by way of a communications bus 146. References to these components of receiver 120 cover embodiments in which one or more of these components (and combinations thereof) are included.

The receiver 120 converts energy from received signals 116 (also referred to herein as RF power transmission signals, or simply, RF signals, RF waves, power waves, or power transmission signals) into electrical energy to power and/or charge electronic device 122. For example, the receiver 120 uses the power converter 126 to convert energy derived from power waves 116 to alternating current (AC) electricity or direct current (DC) electricity to power and/or charge the electronic device 122. Non-limiting examples of the power converter 126 include rectifiers, rectifying circuits, voltage conditioners, among suitable circuitry and devices.

In some embodiments, the receiver 120 is a standalone device that is detachably coupled to one or more electronic devices 122. For example, the electronic device 122 has processor(s) 132 for controlling one or more functions of the electronic device 122, and the receiver 120 has processor(s) 140 for controlling one or more functions of the receiver 120.

In some embodiments, the receiver 120 is a component of the electronic device 122. For example, processors 132 control functions of the electronic device 122 and the receiver 120. In addition, in some embodiments, the receiver 120 includes one or more processors 140, which communicates with processors 132 of the electronic device 122.

In some embodiments, the electronic device 122 includes one or more processors 132, memory 134, one or more communication components 136, and/or one or more batteries 130. In some embodiments, these components are interconnected by way of a communications bus 138. In some embodiments, communications between electronic device 122 and receiver 120 occur via communications component(s) 136 and/or 144. In some embodiments, communications between the electronic device 122 and the receiver 120 occur via a wired connection between communications bus 138 and communications bus 146. In some embodiments, the electronic device 122 and the receiver 120 share a single communications bus.

In some embodiments, the receiver 120 receives one or more power waves 116 directly from the transmitter 102 (e.g., via one or more antennas 124). In some embodiments, the receiver 120 harvests power waves from one or more pockets of energy created by one or more power waves 116 transmitted by the transmitter 102. In some embodiments, the transmitter 102 is a near-field transmitter that transmits the one or more power waves 116 within a near-field distance (e.g., less than approximately six inches away from the transmitter 102, or in some other examples, less than (approximately) twelve inches away from the transmitter 102). In other embodiments, the transmitter 102 is a far-field transmitter that transmits the one or more power waves 116 within a far-field distance (e.g., more than approximately six inches away from the transmitter 102, or in some other examples more than (approximately) twelve inches away from the transmitter 102).

After the power waves 116 are received and/or energy is harvested from them, circuitry (e.g., integrated circuits, amplifiers, rectifiers, and/or voltage conditioner) of the receiver 120 converts the energy of the power waves to usable power (i.e., electricity), which powers the electronic device 122 and/or is stored to battery 130 of the electronic device 122. In some embodiments, a rectifying circuit of the receiver 120 translates the electrical energy from AC to DC for use by the electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, the electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into power for charging the electronic devices 122.

In some embodiments, the one or more transmitters 102 adjust values of one or more characteristics (e.g., waveform characteristics, such as phase, gain, direction, amplitude, polarization, and/or frequency) of power waves 116. For example, a transmitter 102 selects a subset of one or more antenna elements of antenna array 110 to initiate transmission of power waves 116, cease transmission of power waves 116, and/or adjust values of one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust values of one or more characteristics for transmitting the power waves 116 to account for changes at the wireless power receiver that may negatively impact transmission of the power waves 116. As described in more detail below, the adjustments made by the transmitter can be determined based on data provided in unidirectional communication signals from the wireless-power-receiving device (e.g., in which the communication component 136 of the device 122a can be used to advertise data related to the receipt of RF power waves by the receiver 120, as described in more detail below in reference to FIGS. 4 and 5A-5C).

Note that, in some embodiments, the transmitter 102 utilizes beamforming techniques to wirelessly transfer power to a receiver 120, while in other embodiments, the transmitter 102 does not utilize beamforming techniques to wirelessly transfer power to a receiver 120 (e.g., in circumstances in which no beamforming techniques are used, the transmitter controller IC 160 discussed below might be designed without any circuitry to allow for use of beamforming techniques, or that circuitry may be present, but might be deactivated to eliminate any beamforming control capability).

In some embodiments, respective antenna arrays 110 of the one or more transmitters 102 may include a set of one or more antennas configured to transmit the power waves 116 into respective transmission fields of the one or more transmitters 102. Integrated circuits (FIG. 1C) of the respective transmitter 102, such as a controller circuit (e.g., a radio frequency integrated circuit (RFIC)) and/or waveform generator, may control the behavior of the antennas. For example, based on the information received from the receiver 120 by way of the communication signal 118 (e.g., an advertisement such as a Bluetooth Low Energy (BLE) advertisement), a controller circuit (e.g., processor 104 of the transmitter 102, FIG. 1A) may determine values of the waveform characteristics (e.g., amplitude, frequency, trajectory, direction, phase, polarization, among other characteristics) of power waves 116 that would effectively provide power to the receiver 120, and in turn, the electronic device 122. The controller circuit may also identify a subset of antennas from the antenna arrays 110 that would be effective in transmitting the power waves 116. In some embodiments, a waveform generator circuit (not shown in FIG. 1A) of the respective transmitter 102 coupled to the processor 104 may convert energy and generate the power waves 116 having the specific values for the waveform characteristics identified by the processor 104/controller circuit, and then provide the power waves to the antenna arrays 110 for transmission.

In some embodiments, the communications component 112 transmits communication signals 118 by way of a wired and/or wireless communication connection to the receiver 120. In some embodiments, the communications component 112 does not transmit anything to the receiver 120, and merely uses the communication component 112 to receive communications (e.g., BLE advertisements) from the receiver 120. In some embodiments, when the communications component 112 does not transmit anything to the receiver 120 there is no established communication channel between the communications component 112 and the receiver 120, which in some embodiments means that the receiving and transmitting devices do not need to go through a handshake protocol to allow for the receiving device to send BLE advertisements to the transmitting device. In some embodiments, the communications component 112 generates beacon signals 118a used for triangulation of the receiver 120 (e.g., test signals). In some embodiments, the beacon signals 118a are used to convey information regarding charging availability from the transmitter 102 to the receiver 120. In some embodiments, the signals 118a are used for adjusting values of one or more waveform characteristics used to transmit the power waves 116 (e.g., convey amounts of power derived from RF test signals). In some embodiments, the transmitter 102 does not need to convey information to the receiver 120 about adjusting values of one or more waveform characteristics to transmit power waves 116, because the advertisements transmitted from the receiver convey all necessary information to allow the transmitter 102 to provide power to the receiver. In some embodiments, the beacon signals 118a include information related to status, efficiency, user data, power consumption, billing, geo-location, and other types of information (as is described in more detail below). In some embodiments, unidirectional advertisement signals 118b are used to convey information regarding charging requirements from the receiver 120 to the transmitter 102. In some embodiments, only the unidirectional advertisement signals 118b transmitted from the receiver 120 to the transmitter 102 include information related to status, efficiency, user data, power consumption, charging information, billing, geo-location, and other types of information.

In some embodiments, the communications component 112 includes a communications component antenna for communicating with the receiver 120 and/or other transmitters 102 (e.g., transmitters 102b through 102n). In some embodiments, these beacon signals 118a unidirectional advertisement signals 118b are sent using a first channel (e.g., a first frequency band) that is independent and distinct from a second channel (e.g., a second frequency band distinct from the first frequency band) used for transmission of the power waves 116. In some embodiments, no channel is created between the transmitter 102 and the receiver 120, and the communications component 112 receives incoming advertisements (e.g., BLE advertisements).

In some embodiments, the receiver 120 optionally includes a receiver-side communications component 144 (which can also be referred to herein as a second communications radio, while the communications component 112 can be referred to herein as a first communications radio) configured to communicate various types of data with one or more of the transmitters 102, through a respective communication signal generated by the receiver-side communications component (in some embodiments, a respective communication signal is referred to as an advertising or advertisement signal). In other embodiments, the receiver 120 can be configured to use the communications component 136 of the device 122a for the purpose of communicating the unidirectional communication advertisements discussed herein (the descriptions herein of the unidirectional advertisements apply to circumstances in which the receiver 120 uses its own communications component 144, as well as to circumstances in which the receiver 120 uses the communications component 136 of the device 122a). The data may include location indicators for the receiver 120 and/or electronic device 122, a power status of the device 122, status information for the receiver 120, status information for the electronic device 122 (e.g., not charging, charging but needs more power, charging at optimal configured rate, charging but receiving too much power, any fault condition, etc.), status information about the power waves 116 (e.g., whether the electronic device 122 requires charging, battery is critical, whether the receiver is on the charger (e.g., transmitter 102) or not (array voltage detected), etc.), and/or status information for pockets of energy. In other words, the receiver 120 may provide data to the transmitter 102, by way of the beacon signals 118a and/or unidirectional advertisement signals 118b regarding the current operation of the system 100, including: information identifying a present location of the receiver 120 or the device 122, an amount of energy (i.e., usable power) received by the receiver 120, and an amount of power received and/or used by the electronic device 122, among other possible data points containing other types of information.

Figure 4:
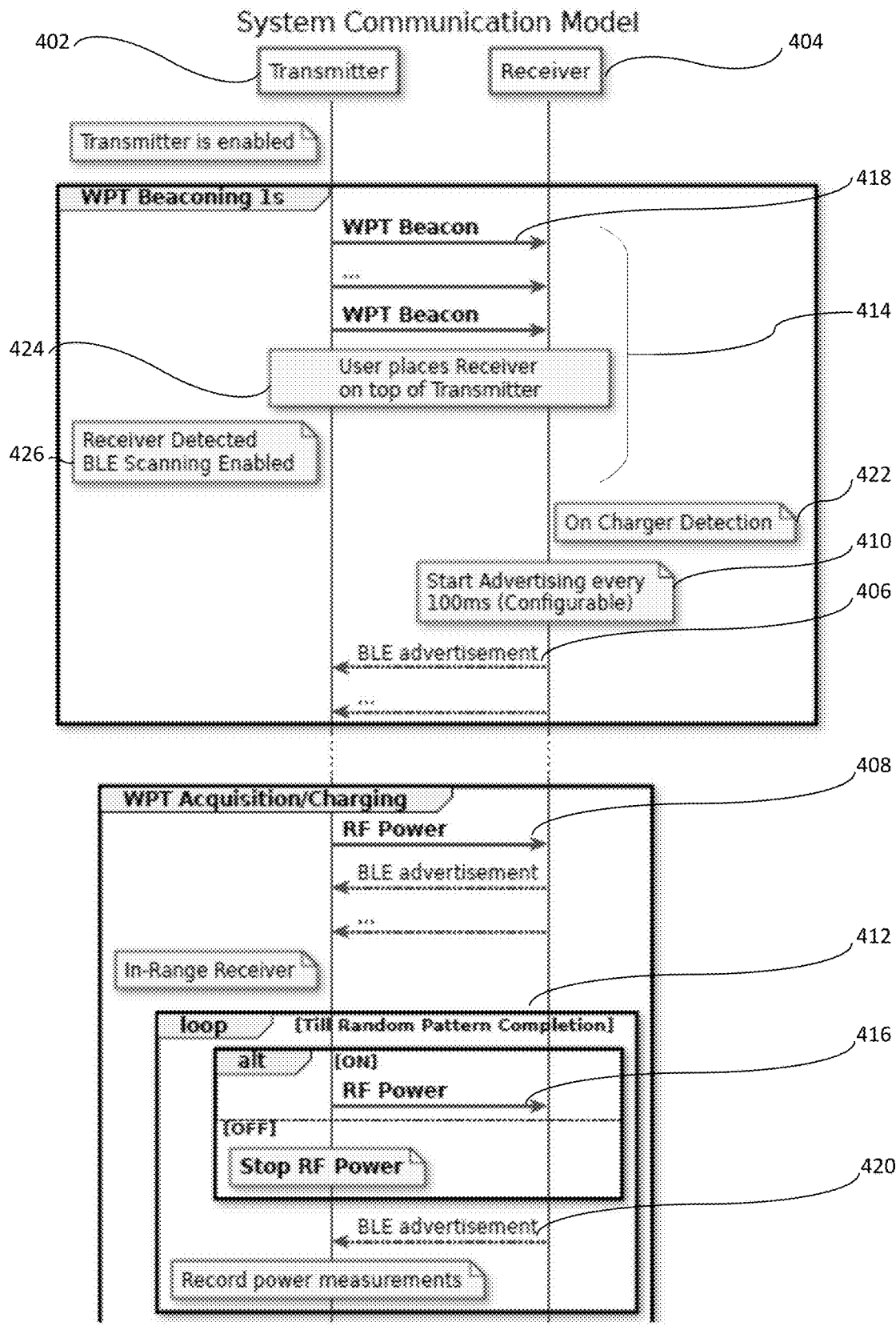
FIG. 4 is a schematic flow diagram illustrating secure wireless transmission of power using unidirectional communication signals from a wireless-power-receiving device.

In some embodiments, the data contained within beacon signals 118a and/or unidirectional advertisement signals 118b is used by the electronic device 122, the receiver 120, and/or the transmitters 102 for determining adjustments to values of one or more waveform characteristics used by the antenna array 110 to transmit the power waves 116. In some embodiments, the receiver 120 uses a beacon signals 118a and/or unidirectional advertisement signals 118b to communicate data for, e.g., alerting transmitters 102 that the receiver 120 has entered or is about to enter a transmission field (e.g., come within wireless-power-transmission range of a transmitter 102), provide information about the electronic device 122, provide user information that corresponds to the electronic device 122, indicate the effectiveness of received power waves 116, and/or provide updated characteristics or transmission parameters that the one or more transmitters 102 use to adjust transmission of the power waves 116. In some embodiments, the alerting of transmitters occurs in response to the electronic device 122 detecting a transmitter beacon signal produced by the transmitter 102. In some embodiments, the transmitter beacon signal is a low-power RF signal, such that the transmitter beacon signal has a lower power level relative to additional wireless-power-transmission signals that are transmitted subsequently after the transmitter has determined that the receiver is within a wireless-power-transmission range of the transmitter (an example of this is shown in the flowchart of FIG. 4).

In some embodiments, transmitter sensor 114 and/or receiver sensor 128 detect and/or identify conditions of the electronic device 122, the receiver 120, the transmitter 102, and/or a transmission field. In some embodiments, data generated by the transmitter sensor 114 and/or receiver sensor 128 is used by the transmitter 102 to determine appropriate adjustments to values of one or more waveform characteristics used to transmit the power waves 116. Data from transmitter sensor 114 and/or receiver sensor 128 received by the transmitter 102 includes, for example, raw sensor data and/or sensor data processed by a processor 104, such as a sensor processor. Processed sensor data includes, for example, determinations based upon sensor data output. In some embodiments, sensor data received from sensors that are external to the receiver 120 and the transmitters 102 is also used (such as thermal imaging data, information from optical sensors, and others).

Figure 1B:
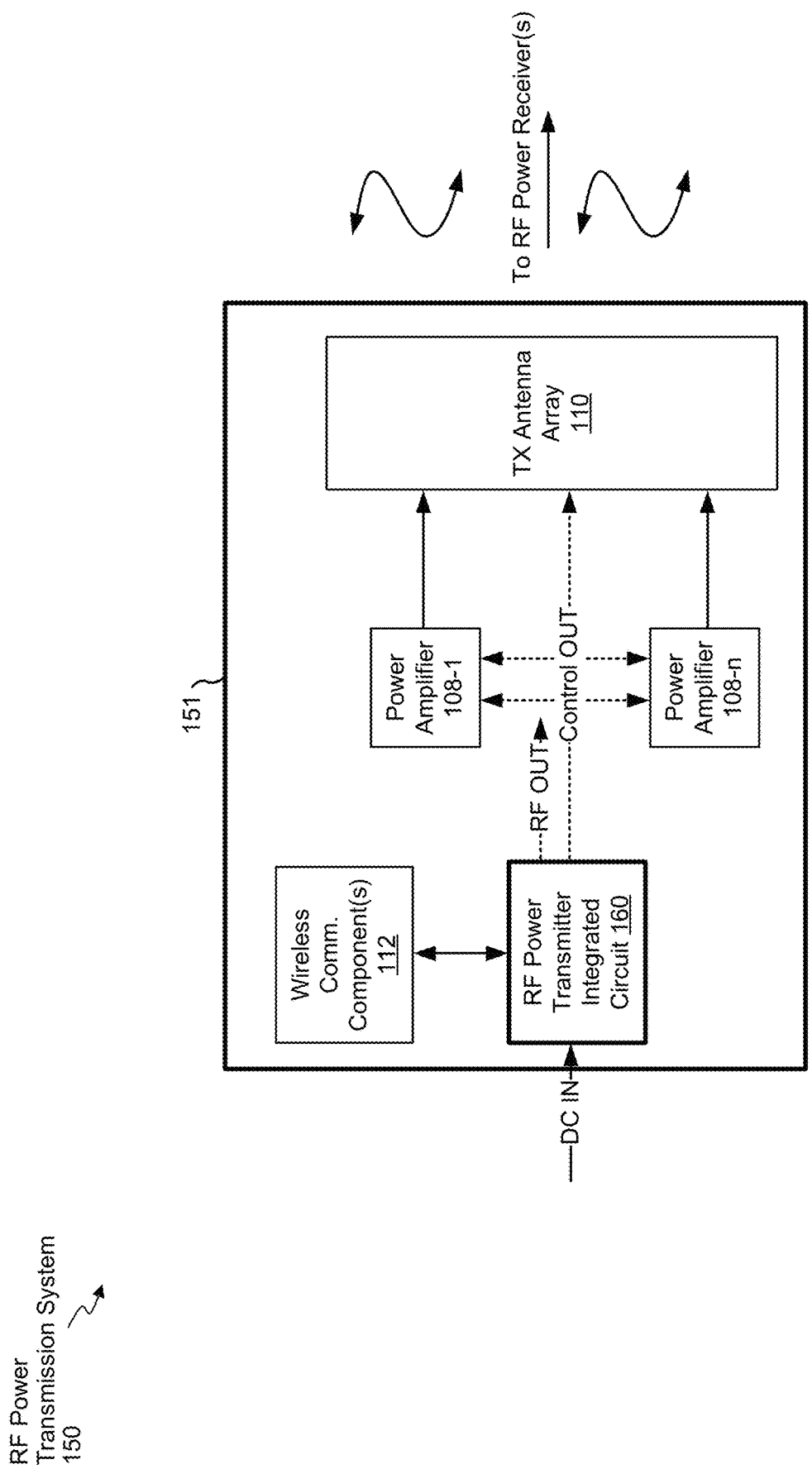
FIG. 1B is another block diagram of an RF wireless power transmission system, in accordance with some embodiments.

FIG. 1B is another block diagram of an RF wireless power transmission system 150 in accordance with some embodiments. In some embodiments, the RF wireless power transmission system 150 includes a far-field transmitter (not shown). In some embodiments, the RF wireless power transmission system 150 includes a near-field transmitter that, in some embodiments, can be part of an RF charging pad 151 (also referred to herein as a near-field (NF) charging pad 151 or RF charging pad 151). The RF charging pad 151 may be an example of the transmitter 102 in FIG. 1A.

In some embodiments, the RF charging pad 151 includes an RF power transmitter integrated circuit 160 (described in more detail below). In some embodiments, the RF charging pad 151 includes one or more communications components 112 (e.g., wireless communication components, such as WI-FI or BLUETOOTH radios). In some embodiments, the RF charging pad 151 also connects to one or more power amplifier units 108-1, . . . 108-n (PA or PA units) to control operation of the one or more power amplifier units when they drive external power-transfer elements (e.g., antennas 290). In some embodiments, RF power is controlled and modulated at the RF charging pad 151 via switch circuitry as to enable the RF wireless power transmission system to send RF power to one or more wireless receiving devices via the TX antenna array 110.

Figure 1C:
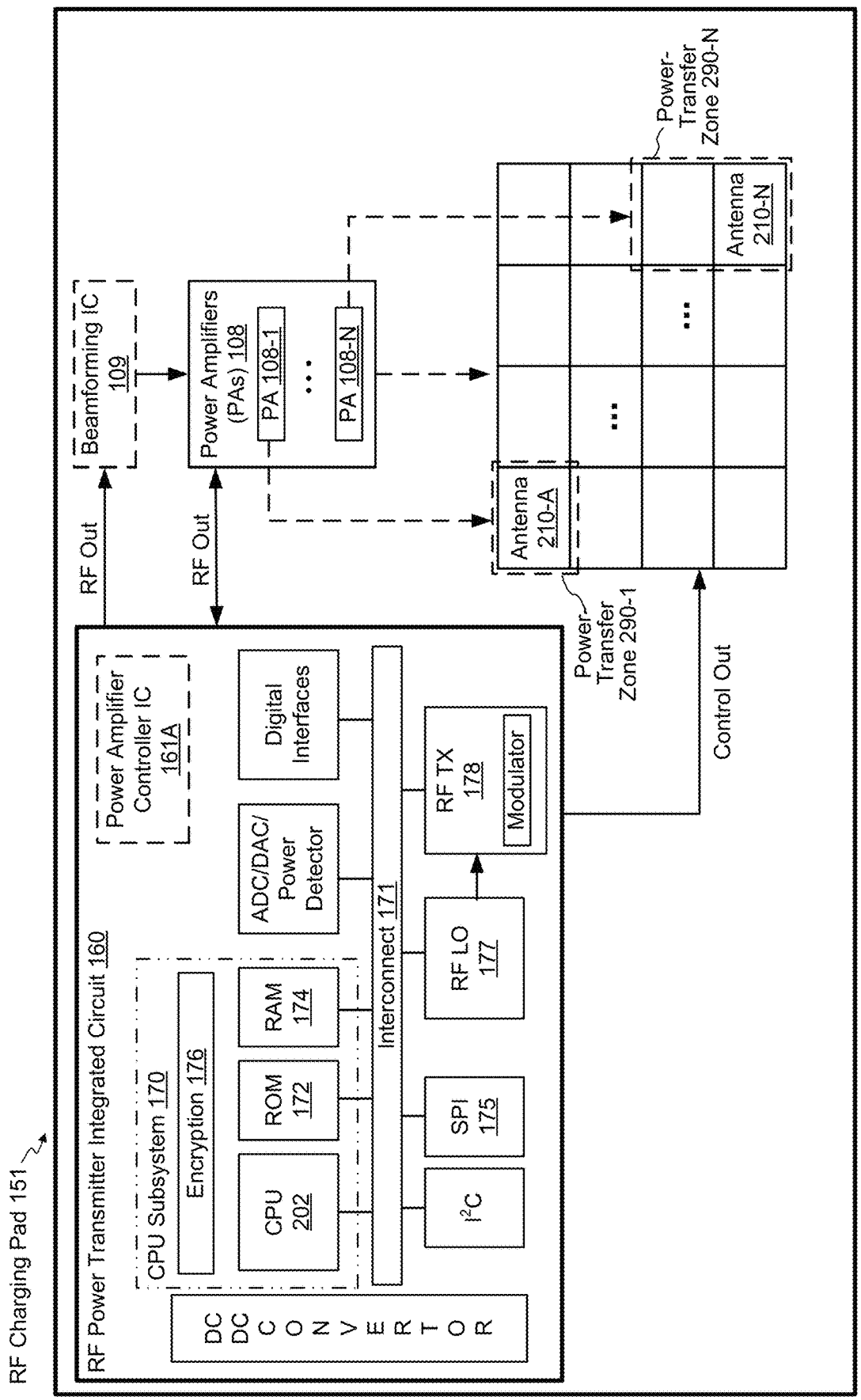
FIG. 1C is a block diagram showing components of an example RF charging pad that includes an RF power transmitter integrated circuit and antenna zones, in accordance with some embodiments.

FIG. 1C is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g., an I²C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 150.

In some embodiments, the RF IC 160 also includes (or is in communication with) a power amplifier controller IC 161A (PA IC) that is responsible for controlling and managing operations of a power amplifier (or multiple power amplifiers), including for reading measurements of impedance at various measurement points within the power amplifier 108, whereby these measurements are used, in some instances, for detecting of foreign objects. The PA IC 161A may be on the same integrated circuit at the RF IC 160, or may be on its on integrated circuit that is separate from (but still in communication with) the RF IC 160. Additional details regarding the architecture and operation of the PA IC are provided in U.S. Provisional Patent Application No. 62/03,677, the disclosure of which is incorporated by reference herein in its entirety.

In some embodiments, executable instructions running on the CPU (such as those shown in the memory 106 in FIG. 2 and described below) are used to manage operation of the RF charging pad 151 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna zones and power-transfer zones, which terms are used synonymously in this disclosure. In some embodiments the antenna/power-transfer zones may include antenna elements that transmit propagating radio frequency waves but, in other embodiments, the antenna/power-transfer zones may instead include capacitive charging couplers that convey electrical signals but do not send propagating radio frequency waves.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zone 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160. In embodiments in which capacitive couplers (e.g., capacitive charging couplers 244) are used as the antennas 210, then optional beamforming IC 109 may not be included in the RF power transmitter integrated circuit 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver). In some embodiments, the PA IC 161A receives the viable RF power level and provides that to the one or more power amplifiers 108.

In some embodiments, the one or more power amplifiers 108 then provide RF signals to the antenna zones 290 (also referred to herein as "power-transfer zones") for transmission to wireless power receivers that are authorized to receive wirelessly delivered power from the RF charging pad 151. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 151 to sequentially or selectively activate different antenna zones in order to determine the most efficient antenna zone 290 to use for transmitting wireless power to a wireless power receiver. In some embodiments, the one or more power amplifiers 108 are also in communication with the CPU subsystem 170 to allow the CPU 202 to measure output power provided by the PAs 108 to the antenna zones 110 of the RF charging pad 151.

FIG. 1C also shows that, in some embodiments, the antenna zones 290 of the RF charging pad 151 may include one or more antennas 210A-N. In some embodiments, each antenna zone of the plurality of antenna zones 290 includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 151. In some embodiments, each antenna zone 290 may include antennas of different types, while in other embodiments each antenna zone 290 may include a single antenna of a same type, while in still other embodiments, the antennas zones may include some antenna zones that include a single antenna of a same type and some antenna zones that include antennas of different types. In some embodiments the antenna/power-transfer zones may also or alternatively include capacitive charging couplers that convey electrical signals but do not send propagating radio frequency waves.

In some embodiments, the RF charging pad 151 may also include a temperature monitoring circuit that is in communication with the CPU subsystem 170 to ensure that the RF charging pad 151 remains within an acceptable temperature range. For example, if a determination is made that the RF charging pad 151 has reached a threshold temperature, then operation of the RF charging pad 151 may be temporarily suspended until the RF charging pad 151 falls below the threshold temperature.

By including the components shown for RF power transmitter circuit 160 (FIG. 1C) on a single chip, such transmitter chips are able to manage operations at the transmitter chips more efficiently and quickly (and with lower latency), thereby helping to improve user satisfaction with the charging pads that are managed by these transmitter chips. For example, the RF power transmitter circuit 160 is cheaper to construct, has a smaller physical footprint, and is simpler to install.

Figure 1D:
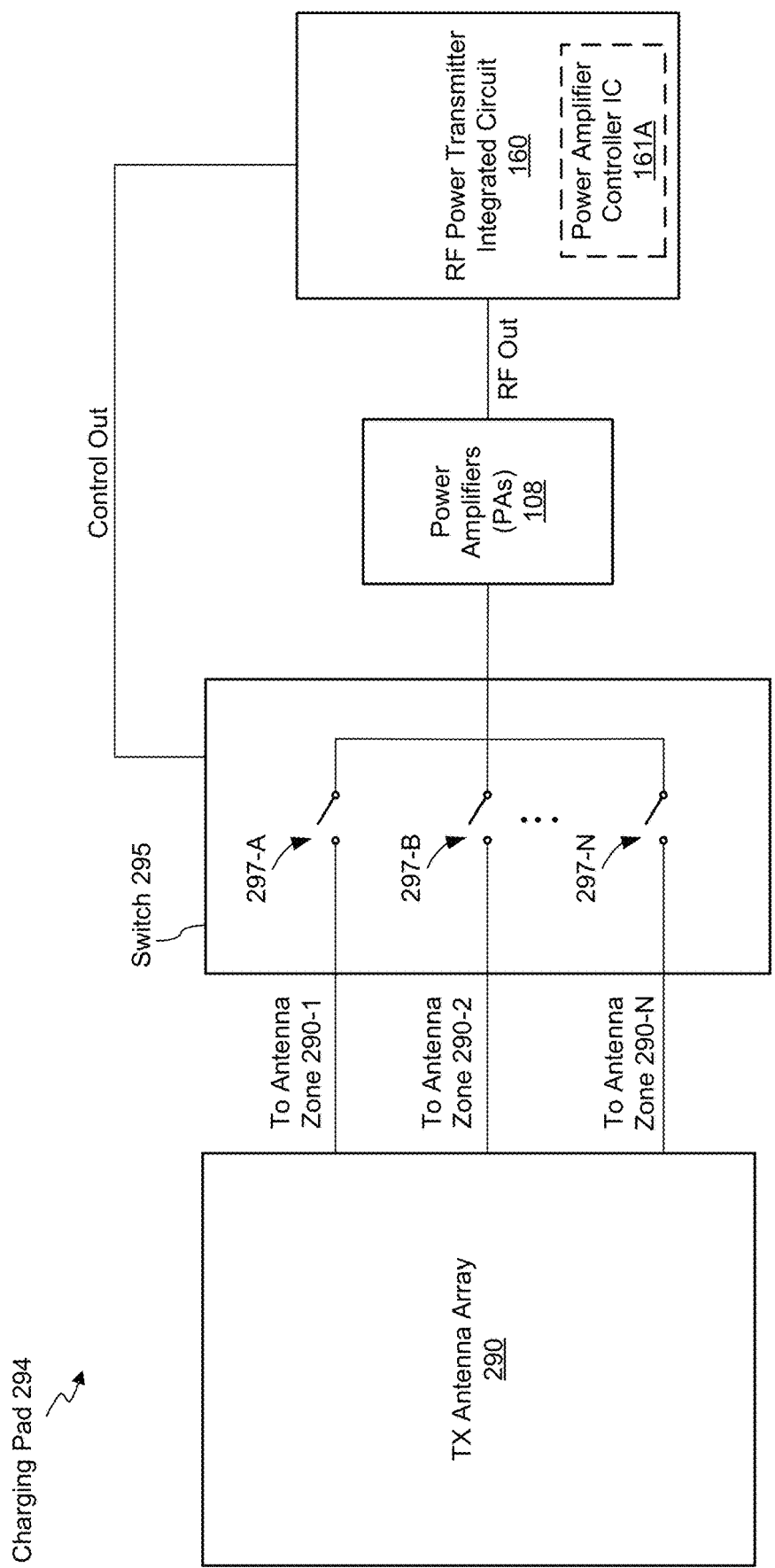
FIG. 1D is a block diagram showing components of an example RF charging pad that includes an RF power transmitter integrated circuit coupled to a switch, in accordance with some embodiments.

FIG. 1D is a block diagram of a charging pad 294 in accordance with some embodiments. The charging pad 294 is an example of the charging pad 151 (FIG. 1B), however, one or more components included in the charging pad 151 are not included in the charging pad 294 for ease of discussion and illustration.

The charging pad 294 includes an RF power transmitter integrated circuit 160, one or more power amplifiers 108, a PA IC 161A (which may be on the same or a separate IC from the RF power transmitter IC 160), and a transmitter antenna array 290 having multiple antenna zones. Each of these components is described in detail above with reference to FIGS. 1A-1C. Additionally, the charging pad 294 includes a switch 295 (i.e., transmitter-side switch), positioned between the power amplifiers 108 and the antenna array 290, having a plurality of switches 297-A, 297-B, . . . 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1C) of the antenna array 290, switch 297-B may be coupled with a second antenna zone 290-2 of the antenna array 290, and so on. Each of the plurality of switches 297-A, 297-B, . . . 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, . . . 297-N may be closed at the same time, thereby creating multiple unique pathways to the antenna array 290 that may be used simultaneously.

In some embodiments, the RF power transmitter integrated circuit 160 (or the PA IC 161A, or both) is (are) coupled to the switch 295 and is configured to control operation of the plurality of switches 297-A, 297-B, . . . 297-N(illustrated as a "control out" signal in FIGS. 1B and 1D). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

In some embodiments, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1D is merely one example.

Figure 2:
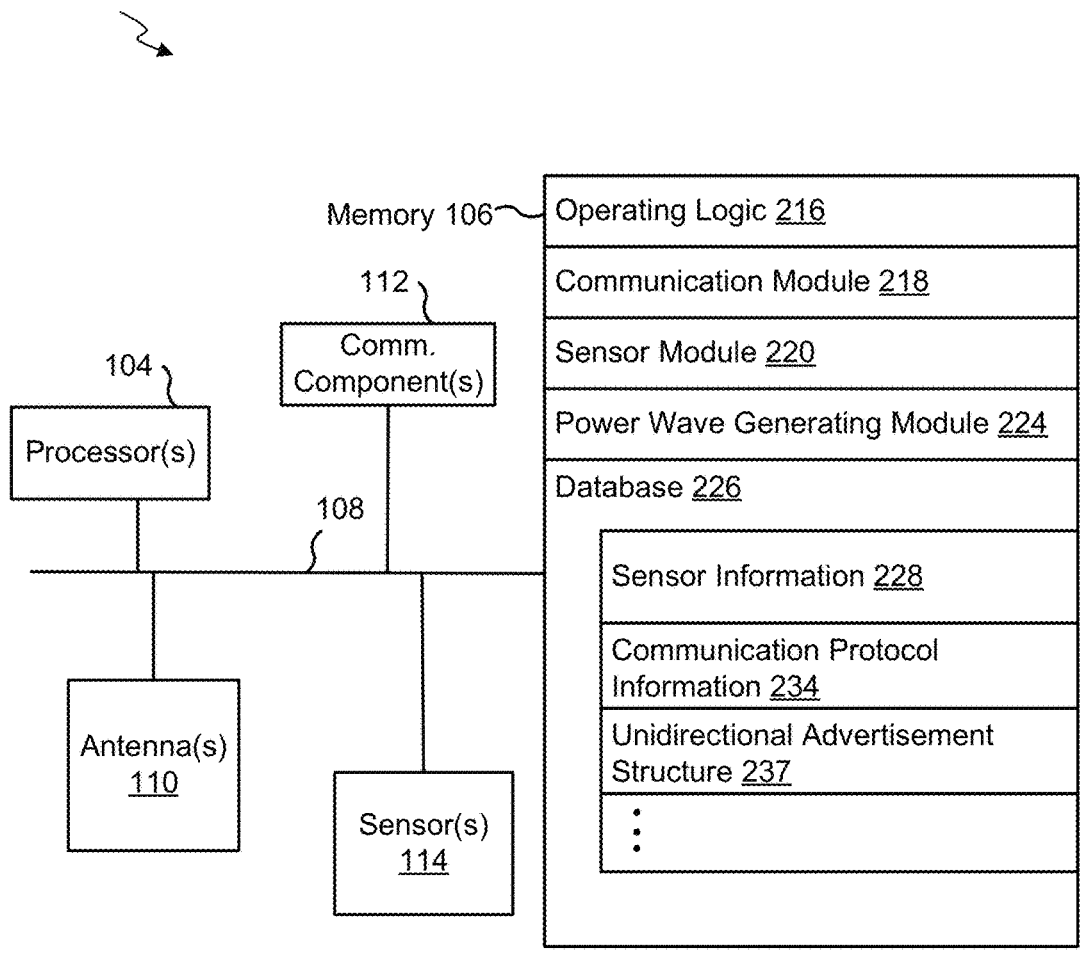
FIG. 2 is a block diagram showing components of an example RF transmitter, in accordance with some embodiments.

FIG. 2 is a block diagram illustrating a representative transmitter device 102 (also sometimes referred to herein as a transmitter 102, a wireless power transmitter 102, and a wireless-power-transmitting device 102) in accordance with some embodiments. In some embodiments, the transmitter device 102 includes one or more processors 104 (e.g., CPUs, ASICs, FPGAs, microprocessors, and the like), one or more communication components 112 (e.g., radios), memory 106, one or more antennas 110, and one or more communication buses 108 for interconnecting these components (sometimes called a chipset). In some embodiments, the transmitter device 102 includes one or more sensors 114 as described above with reference to FIG. 1A. In some embodiments, the transmitter device 102 includes one or more output devices such as one or more indicator lights, a sound card, a speaker, a small display for displaying textual information and error codes, etc. In some embodiments, the transmitter device 102 includes a location detection device, such as a GPS (global positioning satellite) or other geo-location receiver, for determining the location of the transmitter device 102.

The communication components 112 enable communication between the transmitter 102 and the receiver 120 (e.g., one or more communication networks). In some embodiments, the communication components 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

- operating logic 216 including procedures for handling various basic system services and for performing hardware dependent tasks;
- communication module 218 for coupling to and/or communicating with remote devices (e.g., remote sensors, transmitters, receivers, servers, etc.), in conjunction with communication component(s) 112 and/or antenna(s) 110;
- sensor module 220 for obtaining and processing sensor data (e.g., in conjunction with sensor(s) 114) to, for example, determine the presence, velocity, and/or positioning of object in the vicinity of the transmitter 102;
- power wave generating module 224 for generating and transmitting (e.g., in conjunction with antenna(s) 110) power waves. In some embodiments, the power wave generating module 224 receives instructions from the transmitter controller IC based on information provided by unidirectional communication signals received at the transmitter from the receiving device (an example of which is shown in FIG. 4);
- database 226, including but not limited to:
  - sensor information 228 for storing and managing data received, detected, and/or transmitted by one or more sensors (e.g., sensors 114 and/or one or more remote sensors);
  - communication protocol information 234 for storing and managing protocol information for one or more protocols (e.g., custom or standard wireless protocols, such as ZigBee, Z-Wave, etc., and/or custom or standard wired protocols, such as Ethernet).
  - unidirectional advertisement structure 237 allows the first communications radio of the transmitting device to decipher information provided by a second communications radio of a receiving device in, e.g. a BLE advertisement signal.

Each of the above-identified elements (e.g., modules stored in memory 106 of the transmitter 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above, such as a tracking module for tracking the movement and positioning of objects within a transmission field.

Figure 3:
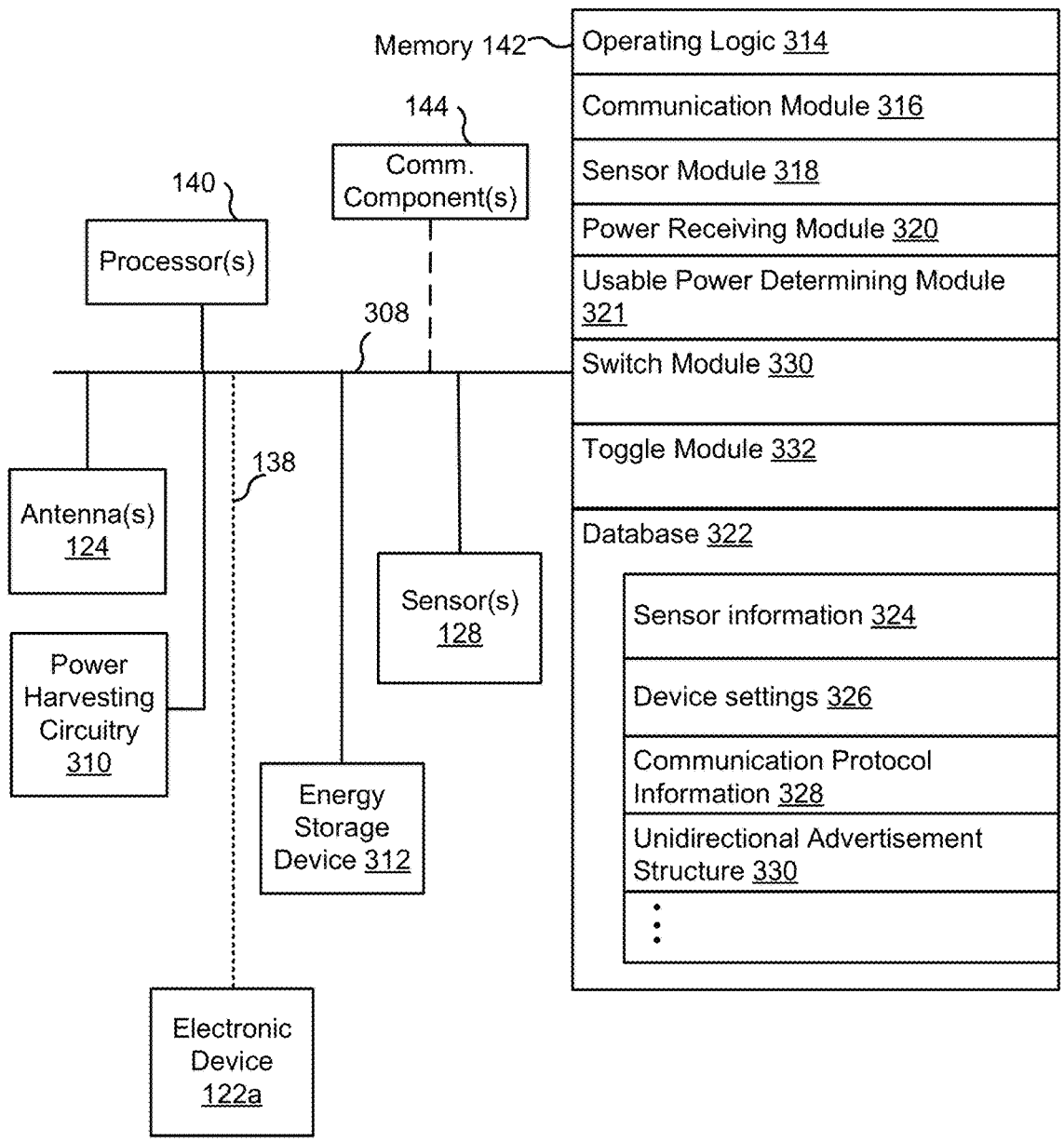
FIG. 3 is a block diagram showing components of an example RF receiver, in accordance with some embodiments.

FIG. 3 is a block diagram illustrating a representative receiver device 120 (also referred to herein as a receiver 120, a wireless power receiver 120, and wireless-power-receiving circuitry 120) in accordance with some embodiments. In some embodiments, the receiver device 120 includes one or more processors 140 (e.g., CPUs, ASICs, FPGAs, microprocessors, and the like), one or more communication components 144, memory 142, one or more antennas 124, power harvesting circuitry 310, and one or more communication buses 308 for interconnecting these components (sometimes called a chipset). In some embodiments, the receiver device 120 includes one or more sensors 128 such as one or sensors described above with reference to FIG. 1A. In some embodiments, the receiver device 120 includes an energy storage device 312 for storing energy harvested via the power harvesting circuitry 310. In various embodiments, the energy storage device 312 includes one or more batteries (e.g., battery 130, FIG. 1A), one or more capacitors, one or more inductors, and the like.

As described above with reference to FIG. 1A, in some embodiments, the receiver 120 is internally or externally connected to an electronic device (e.g., electronic device 122a, FIG. 1A) via a connection 138 (e.g., a bus). In some embodiments, the energy storage device 312 is part of the electronic device.

In some embodiments, the power harvesting circuitry 310 includes one or more rectifying circuits and/or one or more power converters. In some embodiments, the power harvesting circuitry 310 includes one or more components (e.g., a power converter 126) configured to convert energy from power waves and/or energy pockets to electrical energy (e.g., electricity). In some embodiments, the power harvesting circuitry 310 is further configured to supply power to a coupled electronic device (e.g., an electronic device 122), such as a laptop or phone. In some embodiments, supplying power to a coupled electronic device include translating electrical energy from an AC form to a DC form (e.g., usable by the electronic device 122).

The communication component(s) 144 enable communication between the receiver 120 and the transmitter 102 (e.g., via one or more communication networks). In some embodiments, the communication component(s) 144 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some embodiments, the receiver 120 uses a communications component of the electronic device. In some embodiments, when the receiver 120 uses a communications component of the electronic device, the receiver 120 does not include a communication component 144. In some embodiments, the communications component is external to the receiver 120.

The memory 142 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 142, or alternatively the non-volatile memory within memory 142, includes a non-transitory computer-readable storage medium. In some embodiments, the memory 142, or the non-transitory computer-readable storage medium of the memory 142, stores the following programs, modules, and data structures, or a subset or superset thereof:

- operating logic 314 including procedures for handling various basic system services and for performing hardware dependent tasks;
- communication module 316 for coupling to and/or communicating with remote devices (e.g., remote sensors, transmitters, other receivers, servers, electronic devices, mapping memories, etc.) in conjunction with the communication component(s) 144 and/or antenna(s) 124. For example, the communication module 316 can be used in conjunction with second communications radio of the receiving device to provide advertisement signals to a first communications radio of the transmitting device, such that the second communications radio is able to provide data packets to the first communications radio that allow the transmitter to make certain adjustment to the transmission of power to the receiving device (and all this can be done without establishing a communication channel between the first and second communications radios);

sensor module 318 for obtaining and processing sensor data (e.g., in conjunction with sensor(s) 128) to, for example, determine the presence, velocity, and/or positioning of the receiver 120, a transmitter 102, or an object in the vicinity of the receiver 120;

power receiving module 320 for receiving (e.g., in conjunction with antenna(s) 124 and/or power harvesting circuitry 310) and optionally converting (e.g., in conjunction with power harvesting circuitry 310) the energy (e.g., to direct current); transferring the energy to a coupled electronic device (e.g., an electronic device 122); and optionally storing the energy (e.g., in conjunction with energy storage device 312)

power determining module 321 for determining (in conjunction with operation of the power receiving module 320) an amount of power received by the receiver based on energy extracted from power waves (or RF test signals) and/or pockets or energy at which the power waves converge (e.g., RF signals 116, FIG. 1A). In some embodiments, the amount of power is reported in the data packets provided in the advertisement signals sent from the second communications radio of the receiving device to the first communications radio of the transmitting device;

a switch module 330 for signaling when to open a switch of the power harvesting circuitry 310 in order to stop power surges from damaging sensitive components;

A toggle module 332 for controlling the impedance mismatch in the system, which in turn can cause a portion of the incoming power to be reflected from the antenna of the wireless power receiver. By modulating the amount of power reflected by the antenna device can communicate with a wireless power transmitter without needing a dedicate communication component (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.); and database 322, including but not limited to:
  sensor information 324 for storing and managing data received, detected, and/or transmitted by one or more sensors (e.g., sensors 128 and/or one or more remote sensors);
  device settings 326 for storing and managing operational settings for the receiver 120, a coupled electronic device (e.g., an electronic device 122), and/or one or more remote devices; and
  communication protocol information 328 for storing and managing protocol information for one or more protocols (e.g., custom or standard wireless protocols, such as ZigBee, Z-Wave, etc., and/or custom or standard wired protocols, such as Ethernet).
  unidirectional advertisement structure 330 allows the first communications radio of the transmitting device to decipher information provided by a second communications radio of a receiving device in, e.g. a BLE advertisement signal.

In some embodiments, the power receiving module 320 communicates the amount of power to the communication module 316, which communicates the amount of power to other remote devices (e.g., transmitter 102, FIGS. 1-2). In some embodiments, this communication model 316 transmits advertisements, and does not open a dedicated channel with any particular transmitter (e.g., transmitter 102). Moreover, in some embodiments, the power receiving module 320 may communicate the amount of power to database 322 (e.g., the database 322 stores the amount of power derived from one or more power waves 116). Alternatively, in some embodiments, the power receiving module 320 instructs the communication module 316 to transmit data packets to the remote devices (e.g., a respective data packet can include information for multiple test signals transmitted by the transmitter 102).

In some embodiments, the wireless-power transmission system described herein can be used in one or more of: near-field, NF+, mid-field, and far-field transmission applications. Near-field refers to the region around the transmission antenna that is within approximately one wavelength or less (of a power wave to be transmitted by the transmitter device at a certain frequency). Far-field refers to the region around the transmission antenna that is approximately two wavelengths or more (of a power wave to be transmitted by the transmitter device at a certain frequency). Mid-field refers to the region between near field and far field. For example, when the frequency of a transmission wave is 2.4 GHz, the NF+ range is equal or within around 0.188 m, the near-field range is equal or within around 0.125 m, the mid-field range is from around 0.125 m to around 0.25 m, and the far-field range is equal or greater than around 0.25 m. In another example, when the frequency of the transmission wave is 5 GHz, the NF+ range is equal or within around 0.09 m, the near-field range is equal or within around 0.06 m, the mid-field range is from around 0.06 m to around 0.12 m, and the far-field range is equal or greater than around 0.12 m. In some embodiments, the operating frequency ranges from 400 MHz to 60 GHz.

Each of the above identified elements (e.g., modules stored in memory 142 of the receiver 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 142, optionally, stores a subset of the modules and data structures identified above. Furthermore, the memory 142, optionally, stores additional modules and data structures not described above, such as an identifying module for identifying a device type of a connected device (e.g., a device type for an electronic device 122).

Simplex NF/NF+ Software Design

Overview

In some embodiments, in a simplex mode the communication between a wireless-power transmitting device (e.g., transmitter 402 in FIG. 4, equivalent to transmitter 102 in FIG. 1) and wireless-power receiving device (e.g., receiver 404 in FIG. 4, equivalent to receiver 120 in FIG. 1) happens in one direction (e.g., unidirectional communication). In some embodiments, a Bluetooth Low Energy (BLE) advertisement (e.g., indicated by BLE advertisement arrow 406 in FIG. 4) from a receiver 404 is used by the transmitter 402 as a pseudo one-way communication channel to receive the advertisements. The following description describes the system requirements, operation/provisioning modes, design, and implementation details of at least one embodiment.

Acronyms Used in the Descriptions Herein

| | |
|---|---|
| AD | Advertisement Data |
| ADV | Advertisement |
| AFV | Advertisement Format Version |
| API | Application Programming Interface |
| BLE | Bluetooth Low Energy |
| RX | Receiver |
| TX | Transmitter |
| RF | Radio Frequency |
| WPT | Wireless Power Transfer |

Advantages

Below is a summary of example advantages of the disclosed embodiments. In some embodiments, the secure wireless transmission of power using unidirectional communication is advantageous because it is simpler to implement for end customers. In some embodiments, the amount of software code on the wireless-power receiving device is minimal. In some embodiments, wireless-power-transmitting device 402 is able to verify that the wireless-power-receiving device 404 receives power based on only the one-way communications it receives from the wireless-power-receiving device 404. The system also has the ability to cease sending power to a receiver that is already being sent power by nearby transmitters. In some embodiments, the wireless-power-transmitter includes counter measures for combating unauthorized receivers or mitigating replay while receiving broadcasts from a wireless-power-transmitting device.

In some embodiments, wireless-power-receiving device broadcasts, via BLE advertisements, the below information corresponding to power, voltage, battery percentage, and charge status. In some embodiments, the wireless-power receiving device can broadcast, via BLE advertisements, whether a storage element (e.g., a battery, capacitor, etc.,) of the wireless-power-receiving device requires charging. In some embodiments, the wireless-power receiving device can broadcast, via BLE advertisements, the condition of the storage element associated with the wireless-power-receiving device is in a critical state (e.g., not within operating temperature, overcharged, undercharged, or another error associated with storage elements). In some embodiments, the wireless-power receiving device can broadcast, via BLE advertisements, whether the wireless-power-receiving device is within range of the wireless-power-transmitter device or not (e.g., the array voltage is detected). In some embodiments, the wireless-power receiving device can broadcast, via BLE advertisements, that the storage element associated with the wireless-power-receiving device is not charging. In some embodiments, the wireless-power receiving device can broadcast, via BLE advertisements, that the storage element associated with the wireless-power-receiving device is charging but needs more power from the wireless-power-transmitting device. In some embodiments, the wireless-power receiving device can broadcast, via BLE advertisements, that the storage element associated with the wireless-power-receiving device is charging at an optimal configured rate from the wireless-power-transmitting device. In some embodiments, the wireless-power receiving device can broadcast, via BLE advertisements, that the storage element associated with the wireless-power-receiving device is charging but is receiving too much power from the wireless-power-transmitting device. In some embodiments, the wireless-power receiving device can broadcast, via BLE advertisements, that the storage element and/or the wireless-power-receiving device is presenting a fault condition.

System Communication Model

In some embodiments, the wireless-power-transmitting device 404 monitors received wireless-power-transmission signals in accordance with the broadcasted data packet (e.g., BLE advertisement broadcasted from the wireless-power-transmitting device 402). For example, FIG. 4 first shows arrow 406 that corresponds to a BLE advertisement, and then shows at a later time a change in received RF power, as indicated by arrow 408 stating "RF Power"). In some embodiments, the wireless-power-receiving device 402 continuously updates its broadcasted data packets (e.g., BLE advertisement data) with its current charging state of the storage element associated with the wireless-power-receiving device 402, the voltage, power received from the wireless-power-transmitting device 404, and whether more or less power is required from the wireless-power-transmitting device 404, etc. (e.g., as indicated by text box 410 in FIG. 4 that recites that advertising occurs every 100 ms).

In some embodiments, the wireless-power-transmitting device 404 confirms the received broadcasted data packets (e.g., reporting) from the wireless-power-receiving device 402 is correct for the transmitter's state For example, in some embodiments, this is achieved by having the wireless-power-transmitting device 404 use a pattern (e.g., a random pattern) of turning the power ON and OFF the power emitted by the wireless-power-transmitting device 404 and determining, via the wireless-power-transmitting device, whether the wireless-power-receiving device's 402 broadcasted information that includes received power information (e.g., the reporting values) corresponds to the power transmitted by the wireless-power-transmitting device 404 (e.g., as indicated in FIG. 4 by the process block 412, which illustrates such an interaction). This confirmation process ensures that the wireless-power-transmitting device 404 is tracking the correct wireless-power-receiving device(s) 402 even if other transmitters (e.g., ones provided by manufacturer different from the transmitter implementing the simplex communication method described herein) is charging other wireless-power-receiving devices nearby. An illustration of this interaction is shown in FIG. 4.

In some embodiments, each of the additional wireless power-transmission signals (e.g., arrow 416 stating "RF Power" in FIG. 4) has a certain power level that is both predetermined by the wireless-power-transmitting device 402 and is a higher power level than the power level that was used for a first wireless-power-transmission signal (e.g., arrow 408 stating "RF Power" in FIG. 4). In this way, receipt of the additional wireless-power-transmission signals at the wireless-power-receiving device 404 can be verified by the wireless-power-transmitting device 404 by checking a reported power level from the wireless-power-receiving device 402 (e.g., arrow 416 stating "RF Power" in FIG. 4).

System Supported Modes

In some embodiments, the system communication model is an open mode, and there is no authentication and/or encryption in this mode. In some embodiments, the open mode can be useful for devices with very small memory footprints (e.g., 32 kBs) and charging requirements where data protection is not required.

In some embodiments, the system is protected, and data will be encrypted using shared key. For example, in some embodiments at least some portions of the data included in the broadcasted data packets (e.g., BLE advertisements and/or WPT beacon) will be encrypted using a shared key. This mode provides a level of security without taking up much memory space. The shared key can be protected to avoid potential security threats, and the shared key in some embodiments can be provisioned at the manufacturing time.

In some embodiments, the system is private, and authentication and encryption are provided using public key cryptography. For example, in some embodiments at least some portions of the data included in the broadcasted data packets (e.g., BLE advertisements and/or WPT beacon) will be encrypted using a public key. In some embodiments, wireless-power-receiving device 402 and wireless-power transmitting device 404 can be provisioned using the public key of another party to derive a common pre-shared key. This key can be directly or indirectly used to encrypt the data found within the broadcast. This security mode provides additional security compared to the other modes described above. In some embodiments, this mode has keys that are dynamically generated.

Receiver ADV Service Data Format

In some embodiments, data packets that are broadcasted by the second communications radio (also referred to herein as BLE advertisements for embodiments in which BLE radios are used) include a predetermined format, an example of that format is provided below for reference:

| Byte Number | Encryption | Length | Value | Description |
|---|---|---|---|---|
| 0 | Open | 1 | 0x12 | Length of Advertisement Data |
| 1 | | 1 | 0x16 | Service Data Type |
| 2 | | 2 | 0xFFFC | Airfuel Alliance SDO |
| 4 | | 1 | 0x00 | Technology Type, RF-A, Manufacturer Specific |
| 5 | | 1 | 0x5X | Advertisement Format Version (AFV) |
| 6 | Encrypted | 2 | 0xXX | Sequence Counter |
| 8 | | 1 | 0xXX | Receiver AD Flags |
| 9 | | 1 | 0x00 | BLE TX power in dBm (Signed) |
| 10 | | 1 | 0x00 | Battery Percentage (Encoded) |
| 11 | | 2 | 0x0000 | Device Power in mW (Encoded) |
| 13 | | 2 | 0x0000 | Array Voltage in mV (Encoded) |
| 15 | | 2 | 0x0000 | Load Voltage in mV (Encoded) |
| 17 | | 2 | 0x0000 | Array Power in mW (Encoded) |
| 19 | | 2 | 0x0000 | Battery Voltage in mV (Encoded) |

In other words, in some embodiments, the data packet and the additional data packet(s) provided by the second communications radio include information pertaining to: Length of Advertisement Data, Service Data Type, Airfuel Alliance SDO, Technology Type, RF-A, manufacturer specific, Advertisement Format Version (AFV), Sequence Counter, Receiver AD Flags, BLE TX power in dBm (Signed), Battery Percentage (Encoded), Device Power in mW (Encoded), Array Voltage in mV (Encoded), Load Voltage in mV (Encoded), Array Power in mW (Encoded), and/or Battery Voltage in mV (Encoded). In some embodiments, a first set of the data included in the data packets that are broadcasted by the receivers is encrypted/encoded, while a second set of the data included in the data packets that are broadcasted by the receivers is not encrypted/encoded.

Additional details regarding the data included with some of the bytes in the data packets that are broadcasted by the receivers are also provided below.

Receiver Advertisement Format Version

The below table illustrates additional structure/information concerning byte 5 in the example data packets broadcasted by a receiver device that were discussed above. This additional structure/information helps to ensure a common advertisement messaging structure that supports multiple types of devices. Using this structure, communicating devices can distinguish the type of device, their supported message formats, and their encryption status. This also allows for future modification of the message structure without breaking backwards compatibility.

| Bit | 7 | 6 | 5 | 4 | 3 | 2 | 1 | 0 |
|---|---|---|---|---|---|---|---|---|
| Desc | Protocol Version | | | | Encr | MF/FF | NF/NF+ | 0-TX 1-RX |

In some embodiments, at least four bits of the common advertisement messaging structure is allocated to the protocol version. In some embodiments, at least one bit of the common advertisement messaging structure is allocated to encryption. In some embodiments, at least one bit of the common advertisement messaging structure is allocated to MF/FF data. In some embodiments, at least one bit of the common advertisement messaging structure is allocated to NF/NF+ data. In some embodiments, at least one bit of the common advertisement messaging structure is allocated to information as to whether the data corresponds to the transmitter or receiver.

Receiver AD Flags

The below table illustrates additional structure/information concerning byte 8 in the example data packets broadcasted by a receiver device that were discussed above. The below table shows a set of flags that indicate a receiver's charging status, which helps a transmitter determine the best charging algorithm for optimal system performance (e.g., a charging algorithm that ensures the receiver is receiving an amount of usable power that is sufficient to provide power or charge to the receiver).

| Bit | 7 | 6 | 5 | 4 | 3 | 2 | 1 | 0 |
|---|---|---|---|---|---|---|---|---|
| Desc | 0-1 Byte Status 1-2 Byte Status | Charge Status | | | On Charger | Battery Critical | Charge Required | Connectable |

Charge Status

In some embodiments, the example data packets broadcasted by a receiver device that were discussed above can include information related to a charge status of the receiver device. The table below details examples of the different charge statuses that the broadcasted data packets can convey.

These are provided to the transmitter to help it determine the best charging algorithm (e.g., a charging algorithm that ensures the receiver is receiving an amount of usable power that is sufficient to provide power or charge to the receiver).

| Bit 6 | Bit 5 | Bit 4 | Description |
|---|---|---|---|
| 0 | 0 | 0 | 0 - Not Charging |
| 0 | 0 | 1 | 1 - Increment Required |
| 0 | 1 | 0 | 2 - Power Optimal |
| 0 | 1 | 1 | 3 - Decrement Required |
| 1 | 0 | 0 | 4 - Fault |
| 1 | 0 | 1 | 5 - Busy |
| — | — | — | Other Values Reserved |

The methods described herein can make use of the charging status information to help improve charging operations. For instance, the methods described herein can include an operation of: in accordance with a determination that broadcasted data packet from a wireless-power-receiving device includes information regarding the wireless-power-receiving device's charge status, the wireless-power-transmitting device is then configured to make an adjustment to the transmission of wireless power that is based on the charging status information (e.g., if the bits 4 through 6 indicate that the receiver requires an increment, then the wireless-power-transmitting device can adjust the transmission of wireless power by increasing a power level with which the power is being delivered to the receiver.

Receiver Charger Detection

In some embodiments, the a device with which the receivers described herein are coupled (e.g., an electronic device configured to receive usable power from the receiver device) can perform charger polling (which can be referred to as receiver charge detection herein) during which an application running on the device can periodically poll (e.g., once every 1 or 2 minutes) for presence of a wireless-power transmitter in proximity to the receiver. Once the charger is detected (e.g., because a power transmission signal is received at the receiver), then the application running on the device can cause can the receiver to begin running a new routine or another software program that causes the receiver to update its broadcasted data packet (e.g., as indicated by the process 414 shown in FIG. 4).

In some embodiments, the receiver charge detection is a receiver single image with charger interrupt. In this mode, the device with which the receiver is coupled can configure a Varray pin as GPIO and interrupt logic HIGH, in accordance with one example technique. The interrupt will be generated once the receiver is put on the charger. The application can start the new routine or other software program discussed above and can update the information included in the broadcasted data packets (e.g., as indicated by the process 414 shown in FIG. 4).

In some embodiments, the receiver charge detection is a receiver dual image. In this mode, the charger detection should be part of the device with which the receiver is coupled. This can be performed by either polling or interrupt. On charger detection customer image can load the new routine or other software program discussed above.

Additional Description of Example Embodiments

Figure 5A:
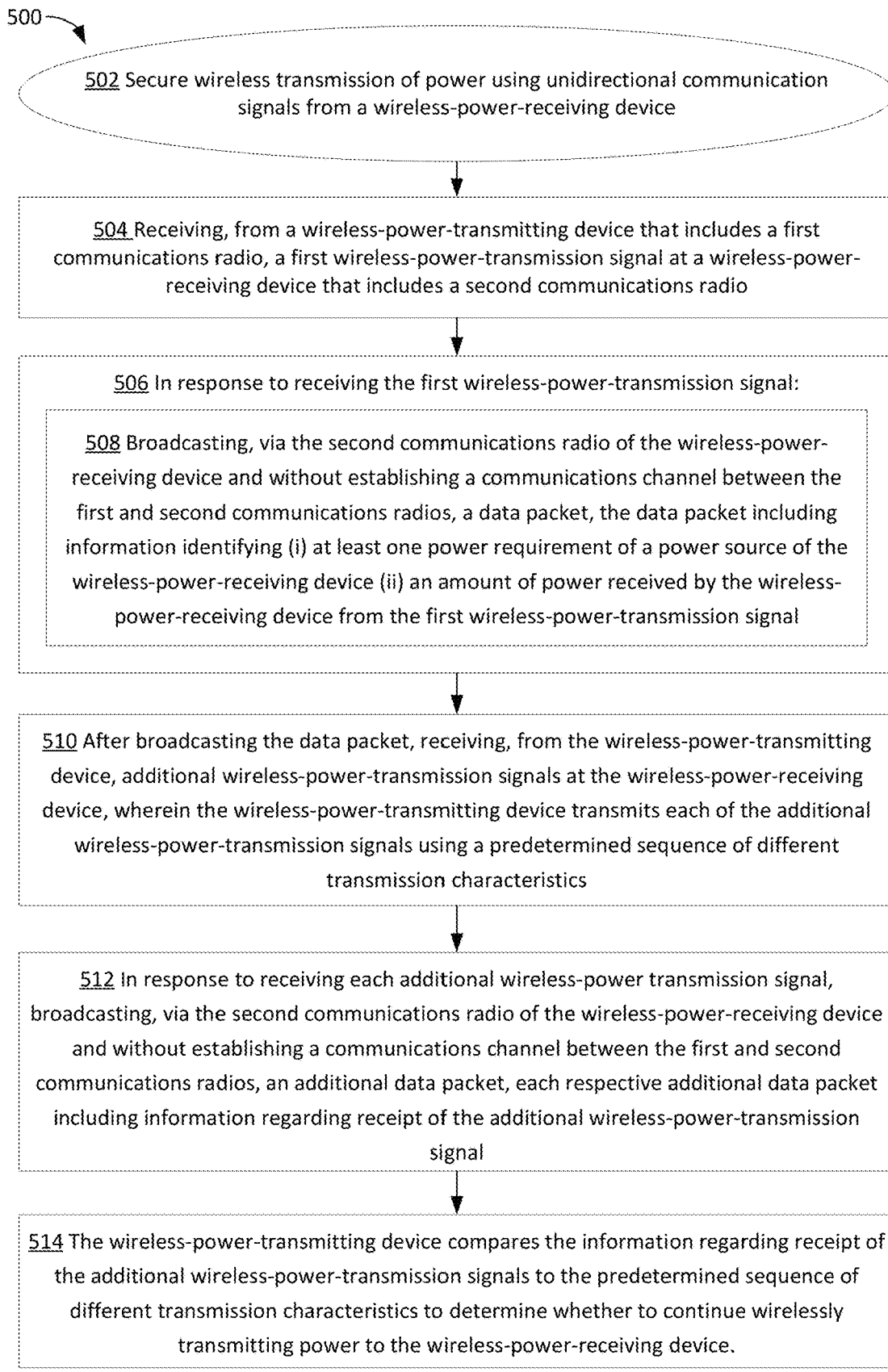

FIGS. 5A-5C show flow diagrams of a method of transmitting unidirectional communication signals, in accordance with some embodiments. Specifically, FIG. 5A-5C shows a method 500 of securing (502) wireless transmission of power using unidirectional communication signals from a wireless-power-receiving device occurs at a wireless-power-receiving device (e.g., receiver 120 in FIG. 1A, receiver 120 in FIG. 3, and receiver 404 (equivalent to receiver 120) FIG. 4).

In some embodiments, a wireless-power-receiving device receives (504), from a wireless-power-transmitting device (e.g., transmitter 102 in FIG. 1A, transmitter 102 in FIG. 2, and wireless-power transmitting device 402 (equivalent to transmitter 102) in FIG. 4) that includes a first communications radio, a first wireless-power-transmission signal at a wireless-power-receiving device that includes a second communications radio.

In some embodiments, in response to the a wireless-power-receiving device receiving (506) the first wireless-power-transmission signal (e.g., FIG. 4 shows an arrow 418 that indicates that a WPT Beacon is transmitted from the wireless-power-transmitting device 404): broadcasting (508), via the second communications radio of the wireless-power-receiving device and without establishing a communications channel between the first and second communications radios, a data packet, the data packet including information identifying (i) at least one power requirement of a power source of the wireless-power-receiving device (ii) an amount of power received by the wireless-power-receiving device from the first wireless-power-transmission signal (e.g., FIG. 4 shows an arrow 406 indicating that a BLE advertisement is broadcasted from the wireless-power-receiving device 404).

In some embodiments, after broadcasting the data packet, receiving (510), from the wireless-power-transmitting device, additional wireless-power-transmission signals at the wireless-power-receiving device (e.g., FIG. 4 shows an arrow 408 that indicates that additional wireless-power-transmission signals have been sent from the wireless-power-transmitting device 402). In some embodiments, the wireless-power-transmitting device transmits each of the additional wireless-power-transmission signals using a predetermined sequence of different transmission characteristics (e.g., as indicated in FIG. 4 by the process block 412).

In some embodiments, in response to the wireless-power-receiving device receiving each additional wireless-power transmission signal, broadcasting (512), via the second communications radio of the wireless-power-receiving device and without establishing a communications channel between the first and second communications radios, an additional data packet (e.g., FIG. 4 shows an arrow 420 that indicates an additional data packet), each respective additional data packet including information regarding receipt of the additional wireless-power-transmission signal.

In some embodiments, the wireless-power-transmitting device compares (514) the information regarding receipt of the additional wireless-power-transmission signals to the predetermined sequence of different transmission characteristics to determine whether to continue wirelessly transmitting power to the wireless-power-receiving device (e.g., as indicated in FIG. 4 by the process block 412).

Turning next to FIG. 5B and continuing the description of method 500, in some embodiments, the data packet and the additional data packets are broadcast (516) via a Bluetooth low energy (BLE) communication protocol (e.g., arrows 406 and 420 in FIG. 4 indicate that BLE advertisements are broadcasted from the wireless-power-receiving device 404).

In some embodiments, the additional data packets include information that causes the wireless-power-transmitting device to adjust (518) characteristics of the additional wireless-power-transmission signals provided to the wireless-power receiving device (e.g., FIG. 4 illustrates that after the transmitter 402 receives the BLE advertisement, as indicated by arrow 406, the wireless power transmitting device 402 begins sending additional RF power, as indicated by arrow 408). In some embodiments, the wireless-power-transmitting device (e.g., transmitter 402 in FIG. 4) adjusts characteristics of the additional wireless power transmission signals when the information specifies that the wireless-power-transmitting device (i) is not charging, (ii) is charging but needs more power, (iii) is charging at an optimal configured rate, (iv) is charging but is receiving too much power, and (v) has a fault condition.

In some embodiments, the wireless-power-receiving device is within a wireless-power-transmission range of the wireless-power-transmitting device when the second communications radio transmits (520) the data packet (e.g., as indicated by text box 422 in FIG. 4 that states "On Charger Detection" and after that detection occurs the BLE Advertisement is sent, as indicated by arrow 406 in FIG. 4).

In some embodiments, the wireless-power-transmission range is near-field transmission range of less than or equal to 12 inches from the wireless-power-transmitting device (522) (e.g., as indicated by text box 424 that states that the "user places receiver on top of transmitter"). In some embodiments, the wireless-power-transmission range is a far-field transmission range of greater than 12 inches from the wireless-power transmission device (524).

In some embodiments, the wireless-power-receiving device is placed (526) within the wireless-power-transmission range before receiving the first wireless-power-transmission signal at the wireless-power-receiving device and while the first communications radio of the wireless-power-transmitting device is not scanning (e.g., as indicated by text box 424). In some embodiments, the wireless-power-transmitting device causes (526) the first communications radio to begin scanning for broadcasted data packets in response to detecting the wireless-power-receiving device within the wireless-power-transmission range (e.g., as indicated by text box 426 in FIG. 4 that states "receiver detected BLE scanning enabled").

Turning next to FIG. 5C and continuing the description of method 500, in some embodiments, the predetermined sequence of different transmission characteristics is a sequence in which the wireless-power-transmitting device sends (528) the additional wireless-power-transmission signals at different points in time by toggling transmissions on and off over a given period of time (e.g., as indicated in FIG. 4 by the process block 412).

In some embodiments, the predetermined sequence of different transmission characteristics is a sequence in which the wireless-power-transmitting device transmits (530) each of the additional wireless-power-transmission signals using different power levels (e.g., as indicated in FIG. 4 by the process block 412).

In some embodiments, the second communications radio of the wireless-power-receiving device communicates (532) in a unidirectional manner with the first communications radio of the wireless-power-transmitting device and does not receive communication from the wireless-power-transmitting device (e.g., as shown in FIG. 4).

In some embodiments, the wireless-power-receiving device broadcasts (534) each of the data packet and the additional data packets at a predetermined time interval (e.g., as shown by text box 410 indicating that BLE advertisements are sent every preset period of time). In some embodiments, the predetermined time interval is equal to 100 ms or less (536) (e.g., as shown by text box 410 indicating that BLE advertisements are sent every 100 ms). In some embodiments, the predetermined time interval is adjustable and can be configured to be 50 ms, 100 ms, 200 ms, 300 ms, 500 ms, or any value below 300 ms. This allows for quick transmission of packets, which causes a quicker response in adjusting power from the wireless-power-transmitting device, Consequently, resulting in better control of the charging characteristics without damaging the battery or other equipment of the wireless-receiving-receiving device.

In some embodiments, the data packet and each respective additional data packet include information about current charging state, voltage, power received from the wireless-power-transmitting device, and information indicating whether more or less power is required (538) (e.g., BLE advertisements 406 and 420 shown in FIG. 4 include this information).

In some embodiments, the data packet and each respective additional data packet include encrypted data (540) (e.g., BLE advertisements 406 and 420 shown in FIG. 4 can include encrypted data).

In some embodiments, the wireless-power-receiving device includes a wireless-power-receiving circuit with power-harvesting circuitry and a memory of approximately 32 KBs (542) (e.g., FIG. 3 showing components of an example RF receiver), and the memory stores instructions that cause the wireless-power-receiving device to perform the instructions of the discussed unidirectional charging process. In some embodiments, these instructions occupy approximately 5 KBs or less of the memory (542). As compared to other systems, an instruction size of 5 KBs represents a significant reduction in the program space, thereby freeing up memory space for other purposes on the receiver side (e.g., receiver 120 in FIG. 3). In this way, the techniques described herein allow the receiver chip to operate more efficiently (e.g., receiver 120 in FIG. 3).

In some embodiments, data packet and the additional data packet also include information regarding a charge status of the power source selected from a group consisting of: the power source (i) is not charging, (ii) is charging but needs more power, (iii) is charging at an optimal configured rate, (iv) is charging but is receiving too much power, and (v) has a fault condition (544) (e.g., BLE advertisements 406 and 420 in FIG. 4 include this information).

In some embodiments, a wireless-power-receiving device that includes a wireless-power-receiving circuit having a memory storing instructions for securely transmitting wireless power using unidirectional communication signals from a wireless-power-receiving device, the instructions causing performance of any of the above discussed features. In some embodiments, a system comprises a receiver and a transmitter, wherein the receiver and transmitter are configured to perform operations to allow for execution of any of the above-discussed features. A non-transitory computer-readable storage medium including instructions that, when executed by one or more processors of a wireless-power-receiving device, cause the one or more processors to perform or cause performance of any of the above discussed features. A wireless-power-receiving device comprising means for causing performance of any of the above-discussed features.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of this disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 206, 256) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of secure wireless transmission of power using unidirectional communication signals from a wireless-power-receiving device, comprising:
    receiving, from a wireless-power-transmitting device that includes a first communications radio, a first wireless-power-transmission signal at the wireless-power-receiving device that includes a second communications radio;
    in response to receiving the first wireless-power-transmission signal:
        broadcasting, via the second communications radio of the wireless-power-receiving device and without establishing a communications channel between the first and second communications radios, a first data packet that includes information identifying (i) at least one power requirement of a power source of the wireless-power-receiving device and (ii) an amount of power received by the wireless-power-receiving device from the first wireless-power-transmission signal;
    receiving, from the wireless-power-transmitting device, a second wireless-power-transmission signal at the wireless-power-receiving device;
    in response to receiving the second wireless-power-transmission signal, broadcasting, via the second communications radio of the wireless-power-receiving device and without establishing a communications channel between the first and second communications radios, a second data packet that includes information indicating that the power source is charging but needs more power, wherein the wireless-power-transmitting device is configured to utilize the information indicating that the power source is charging but needs more power to adjust characteristics of wirelessly transmitted power waves to increase an amount of power provided to the wireless-power-receiving device;
    receiving, from the wireless-power-transmitting device, a third wireless-power-transmission signal at the wireless-power-receiving device; and
    in response to receiving the third wireless-power-transmission signal, broadcasting, via the second communications radio of the wireless-power-receiving device and without establishing a communications channel between the first and second communications radios, a third data packet that includes information indicating that the power source is charging but is receiving too much power, wherein the wireless-power-transmitting device is configured to utilize the information indicating that the power source is charging but is receiving too much power to adjust characteristics of wirelessly transmitted power waves to decrease an amount of power provided to the wireless-power-receiving device.

2. The method of claim 1, including:
after broadcasting the data packet, receiving, from the wireless-power-transmitting device, additional wireless-power-transmission signals at the wireless-power-receiving device, wherein information in the additional wireless-power-transmission signals is based on the data packet.

3. The method of claim 1, wherein the data packet is broadcast via a low-energy communication protocol.

4. The method of claim 1, wherein:
the wireless-power-transmitting device that includes the first communications radio is also configured to send a second wireless-power-transmission signal to another wireless-power-receiving device that includes a third communications radio; and
the other wireless-power-receiving device is configured to, in response to receiving the second wireless-power-transmission signal, broadcast, via the third communications radio of the other wireless-power-receiving device and without establishing a communications channel between the first and third communications radios, another data packet, the other data packet including information identifying (i) at least one power requirement of a power source of the other wireless-power-receiving device, and (ii) an amount of power received by the other wireless-power-receiving device from the second wireless-power-transmission signal.

5. The method of claim 4, wherein the wireless-power-receiving device and the other wireless-power-receiving device receive power from the wireless-power-transmitting device during at least one overlapping period of time.

6. The method of claim 4, wherein the wireless-power-receiving device is a different type of electronic device than the other wireless-power-receiving device.

7. The method of claim 1, wherein the wireless-power-receiving device is within a wireless-power-transmission range of the wireless-power-transmitting device when the second communications radio transmits the data packet.

8. The method of claim 7, wherein the wireless-power-transmission range is a near-field transmission range of less than or equal to 12 inches from the wireless-power-transmitting device.

9. The method of claim 7, wherein the wireless-power-transmission range is a far-field transmission range of greater than 12 inches from the wireless-power-transmitting device.

10. The method of claim 1, wherein the wireless-power-transmitting device includes a charging pad that the wireless-power-receiving device rests on.

11. The method of claim 10, wherein the wireless-power-transmitting device includes a plurality of antennas, wherein respective antennas of the plurality of antennas are configured to be activated based on a determined location of the wireless-power-receiving device on the charging pad.

12. The method of claim 1, wherein the second communications radio of the wireless-power-receiving device communicates in a unidirectional manner with the first communications radio of the wireless-power-transmitting device and does not receive any communication signals from the first communications radio of the wireless-power-transmitting device.

13. The method of claim 1, wherein the data packet includes encrypted data.

14. The method of claim 1, wherein the data packet also includes information regarding a charge status of a power source for the wireless-power-receiving device, the information regarding the charge status of the power source including an indication of one or more of: the power source (i) is not charging, (ii) is charging at an optimal configured rate, (iii) has a fault condition.

15. The method of claim 1, wherein the wireless-power-receiving device broadcasts the data packet a predetermined time interval before transmitting another data packet.

16. A wireless-power-receiving device, comprising:
a power source configured to provide usable power to the wireless-power-receiving device; and
a second communications radio configured to:
receive, from a wireless-power-transmitting device that includes a first communications radio, a first wireless-power-transmission signal at the wireless-power-receiving device that includes the second communications radio; and
in response to receiving the first wireless-power-transmission signal:
broadcast, via the second communications radio of the wireless-power-receiving device and without establishing a communications channel between the first and second communications radios, a first data packet, the first data packet including information identifying (i) at least one power requirement of a power source of the wireless-power-receiving device, and (ii) an amount of power received by the wireless-power-receiving device from the first wireless-power-transmission signal;
receive, from the wireless-power-transmitting device, a second wireless-power-transmission signal at the wireless-power-receiving device;
in response to receiving the second wireless-power-transmission signal, broadcast, via the second communications radio of the wireless-power-receiving device and without establishing a communications channel between the first and second communications radios, a second data packet that includes information indicating that the power source is charging but needs more power, wherein the wireless-power-transmitting device is configured to utilize the information indicating that the power source is charging but needs more power to adjust characteristics of wirelessly transmitted power waves to increase an amount of power provided to the wireless-power-receiving device;
receive, from the wireless-power-transmitting device, a third wireless-power-transmission signal at the wireless-power-receiving device; and
in response to receiving the third wireless-power-transmission signal, broadcast, via the second communications radio of the wireless-power-receiving device and without establishing a communications channel between the first and second communications radios, a third data packet that includes information indicating that the power source is charging but is receiving too much power, wherein the wireless-power-transmitting device is configured to utilize the information indicating that the power source is charging but is receiving too much power to adjust characteristics of wirelessly transmitted power waves to decrease an amount of power provided to the wireless-power-receiving device.

17. A non-transitory computer-readable storage medium including instructions that, when executed by one or more processors of a wireless-power-receiving device, cause the wireless-power-receiving device to:
receive, from a wireless-power-transmitting device that includes a first communications radio, a first wirelesspower-transmission signal at the wireless-power-receiving device that includes a second communications radio; and in response to receiving the first wireless-power-transmission signal:

broadcast, via the second communications radio of the wireless-power-receiving device and without establishing a communications channel between the first and second communications radios, a data packet, the data packet including information identifying (i) at least one power requirement of a power source of the wireless-power-receiving device, and (ii) an amount of power received by the wireless-power-receiving device from the first wireless-power-transmission signal;

receive, from the wireless-power-transmitting device, a second wireless-power-transmission signal at the wireless-power-receiving device;

in response to receiving the second wireless-power-transmission signal, broadcast, via the second communications radio of the wireless-power-receiving device and without establishing a communications channel between the first and second communications radios, a second data packet that includes information indicating that the power source is charging but needs more power, wherein the wireless-power-transmitting device is configured to utilize the information indicating that the power source is charging but needs more power to adjust characteristics of wirelessly transmitted power waves to increase an amount of power provided to the wireless-power-receiving device;

receive, from the wireless-power-transmitting device, a third wireless-power-transmission signal at the wireless-power-receiving device; and in response to receiving the third wireless-power-transmission signal, broadcast, via the second communications radio of the wireless-power-receiving device and without establishing a communications channel between the first and second communications radios, a third data packet that includes information indicating that the power source is charging but is receiving too much power, wherein the wireless-power-transmitting device is configured to utilize the information indicating that the power source is charging but is receiving too much power to adjust characteristics of wirelessly transmitted power waves to decrease an amount of power provided to the wireless-power-receiving device.

* * * * *